US010465457B2

(12) United States Patent
Hebebrand et al.

(10) Patent No.: US 10,465,457 B2
(45) Date of Patent: Nov. 5, 2019

(54) TOOL DETECTION AND ALIGNMENT FOR TOOL INSTALLATION

(71) Applicant: Weatherford Technology Holdings, LLC, Houston, TX (US)

(72) Inventors: Christina Karin Hebebrand, Hannover (DE); Bjoern Thiemann, Burgwedel (DE); Martin Liess, Seelze (DE); Frank Wern, Hannover (DE); Aicam Zouhair, Houston, TX (US); John Fielding Ownby, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

(21) Appl. No.: 15/233,333

(22) Filed: Aug. 10, 2016

(65) Prior Publication Data
US 2017/0044854 A1 Feb. 16, 2017

Related U.S. Application Data

(60) Provisional application No. 62/203,692, filed on Aug. 11, 2015.

(51) Int. Cl.
*E21B 19/16* (2006.01)
*E21B 3/02* (2006.01)
*E21B 44/00* (2006.01)
*E21B 47/00* (2012.01)
*G06T 7/00* (2017.01)
*E21B 19/00* (2006.01)

(52) U.S. Cl.
CPC .............. *E21B 19/165* (2013.01); *E21B 3/02* (2013.01); *E21B 19/00* (2013.01); *E21B 44/00* (2013.01); *E21B 47/0002* (2013.01); *G06T 7/0004* (2013.01); *G06T 2207/10012* (2013.01)

(58) Field of Classification Search
CPC ........... E21B 3/02; E21B 19/00; E21B 19/165
See application file for complete search history.

(56) References Cited

U.S. PATENT DOCUMENTS

| 1,367,156 | A | 2/1921 | McAlvay et al. |
| 1,822,444 | A | 9/1931 | MacClatchie |
| 2,370,354 | A | 2/1945 | Hurst |
| 2,683,379 | A | 7/1954 | Strandgren |
| 3,147,992 | A | 9/1964 | Haeber et al. |
| 3,354,951 | A | 11/1967 | Savage et al. |

(Continued)

FOREIGN PATENT DOCUMENTS

| AU | 2012201644 A1 | 4/2012 |
| AU | 2013205714 A1 | 5/2013 |

(Continued)

OTHER PUBLICATIONS

PCT International Search Report and Written Opinion dated Nov. 11, 2016, for International Application No. PCT/US2016/046445.

(Continued)

*Primary Examiner* — David J Bagnell
*Assistant Examiner* — Brandon M Duck
(74) *Attorney, Agent, or Firm* — Patterson + Sheridan, LLP

(57) ABSTRACT

A modular top drive system for construction of a wellbore includes an alignment assembly configured to align a tool with a top drive unit to facilitate automatic tool installation during rig up.

26 Claims, 11 Drawing Sheets

(56) References Cited

U.S. PATENT DOCUMENTS

| | | |
|---|---|---|
| 3,385,370 A | 5/1968 | Knox et al. |
| 3,662,842 A | 5/1972 | Bromell |
| 3,698,426 A | 10/1972 | Litchfield et al. |
| 3,747,675 A | 7/1973 | Brown |
| 3,766,991 A | 10/1973 | Brown |
| 3,774,697 A | 11/1973 | Brown |
| 3,776,320 A | 12/1973 | Brown |
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,917,092 A | 11/1975 | McGinnis |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,449,596 A | 5/1984 | Boyadjieff |
| 4,478,244 A | 10/1984 | Garrett |
| 4,497,224 A | 2/1985 | Jurgens |
| 4,593,773 A | 6/1986 | Skeie |
| 4,647,050 A | 3/1987 | Johnson |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,916,959 A | 4/1990 | Lively |
| 4,932,253 A | 6/1990 | McCoy |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,018,350 A | 5/1991 | Bender |
| 5,020,640 A | 6/1991 | Nederbragt |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,196,770 A | 3/1993 | Champs et al. |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,404,767 A | 4/1995 | Sutherland |
| 5,433,279 A | 7/1995 | Tessari et al. |
| 5,440,183 A | 8/1995 | Denne |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,540,095 A | 7/1996 | Sherman et al. |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,011,508 A | 1/2000 | Perreault et al. |
| 6,053,191 A | 4/2000 | Hussey |
| 6,101,952 A | 8/2000 | Thornton et al. |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,499,701 B1 | 12/2002 | Thornton et al. |
| 6,508,132 B1 | 1/2003 | Lohr et al. |
| 6,527,047 B1 | 3/2003 | Pietras |
| 6,536,520 B1 | 3/2003 | Snider et al. |
| 6,571,876 B2 | 6/2003 | Szarka |
| 6,578,495 B1 | 6/2003 | Yitts et al. |
| 6,578,632 B2 | 6/2003 | Mullins |
| 6,591,471 B1 | 7/2003 | Hollingsworth et al. |
| 6,595,288 B2 | 7/2003 | Mosing et al. |
| 6,604,578 B2 | 8/2003 | Mullins |
| 6,606,569 B1 | 8/2003 | Potts |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,770,004 B1 | 8/2004 | Lofgren et al. |
| 6,779,599 B2 | 8/2004 | Mullins et al. |
| 6,832,656 B2 | 12/2004 | Fournier, Jr. et al. |
| 6,851,476 B2 | 2/2005 | Gray et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,983,701 B2 | 1/2006 | Thornton et al. |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |

(56) References Cited

U.S. PATENT DOCUMENTS

| | | |
|---|---|---|
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,600 B2 | 2/2007 | Luke et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,290,476 B1 | 11/2007 | Glasson |
| 7,303,022 B2 | 12/2007 | Tilton et al. |
| 7,325,610 B2 | 2/2008 | Giroux et al. |
| 7,353,880 B2 | 4/2008 | Pietras |
| 7,373,971 B2 | 5/2008 | Montgomery |
| 7,445,050 B2 | 11/2008 | Kuttel et al. |
| 7,448,456 B2 | 11/2008 | Shahin et al. |
| 7,451,826 B2 | 11/2008 | Pietras |
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,530,799 B2 | 5/2009 | Smith |
| 7,579,941 B2 | 8/2009 | Cleveland et al. |
| 7,591,304 B2 | 9/2009 | Juhasz et al. |
| 7,617,866 B2 | 11/2009 | Pietras |
| 7,635,026 B2 | 12/2009 | Mosing et al. |
| 7,665,515 B2 | 2/2010 | Mullins |
| 7,665,530 B2 | 2/2010 | Wells et al. |
| 7,665,531 B2 | 2/2010 | Pietras |
| 7,669,662 B2 | 3/2010 | Pietras |
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,712,523 B2 | 5/2010 | Snider et al. |
| 7,730,698 B1 | 6/2010 | Montano et al. |
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,857,043 B2 | 12/2010 | Ali-zada |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Angman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,036,829 B2 | 10/2011 | Gibbs et al. |
| 8,118,106 B2 | 2/2012 | Wiens et al. |
| 8,141,642 B2 | 3/2012 | Olstad et al. |
| 8,210,268 B2 | 7/2012 | Heidecke et al. |
| 8,256,579 B2 | 9/2012 | Jia |
| 8,281,856 B2 | 10/2012 | Jahn et al. |
| 8,307,903 B2 | 11/2012 | Redlinger et al. |
| 8,328,527 B2 | 12/2012 | Ehimeakhe |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,616,134 B2 | 12/2013 | King et al. |
| 8,624,699 B2 | 1/2014 | Hunter et al. |
| 8,636,067 B2 | 1/2014 | Robichaux et al. |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,849,954 B2 | 9/2014 | Kim |
| 8,851,860 B1 | 10/2014 | Mail |
| 8,858,187 B2 | 10/2014 | Lane |
| 8,893,772 B2 | 11/2014 | Henderson et al. |
| 9,068,406 B2 | 6/2015 | Clasen et al. |
| 9,206,851 B2 | 12/2015 | Slaughter, Jr. et al. |
| 9,528,326 B2 | 12/2016 | Heidecke et al. |
| 9,631,438 B2 | 4/2017 | McKay |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0216924 A1 | 11/2004 | Pietras et al. |
| 2005/0000691 A1 | 1/2005 | Giroux et al. |
| 2005/0173154 A1 | 8/2005 | Lesko |
| 2005/0206163 A1 | 9/2005 | Guesnon et al. |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1 | 12/2005 | Folk et al. |
| 2006/0037784 A1 | 2/2006 | Walter et al. |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2007/0030167 A1 | 2/2007 | Li et al. |
| 2007/0044973 A1 | 3/2007 | Fraser et al. |
| 2007/0074588 A1 | 4/2007 | Harata et al. |
| 2007/0074874 A1 | 4/2007 | Richardson |
| 2007/0102992 A1 | 5/2007 | Jager |
| 2007/0131416 A1 | 6/2007 | Odell et al. |
| 2007/0140801 A1 | 6/2007 | Kuttel et al. |
| 2007/0144730 A1 | 6/2007 | Shahin et al. |
| 2007/0158076 A1 | 7/2007 | Hollingsworth et al. |
| 2007/0251701 A1 | 11/2007 | Jahn et al. |
| 2008/0018603 A1 | 1/2008 | Baraz et al. |
| 2008/0059073 A1 | 3/2008 | Giroux et al. |
| 2008/0093127 A1 | 4/2008 | Angman |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0151934 A1 | 6/2009 | Heidecke et al. |
| 2009/0159294 A1 | 6/2009 | Abdollahi et al. |
| 2009/0200038 A1 | 8/2009 | Swietlik et al. |
| 2009/0205820 A1* | 8/2009 | Koederitz .............. E21B 10/00 166/250.01 |
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 | 11/2009 | Alikin et al. |
| 2009/0274544 A1 | 11/2009 | Liess |
| 2009/0274545 A1 | 11/2009 | Liess et al. |
| 2009/0321086 A1 | 12/2009 | Zimmermann |
| 2010/0032162 A1 | 2/2010 | Olstad et al. |
| 2010/0065336 A1* | 3/2010 | Wells ..................... E21B 19/16 175/220 |
| 2010/0101805 A1 | 4/2010 | Angelle et al. |
| 2010/0200222 A1 | 8/2010 | Robichaux et al. |
| 2010/0206583 A1 | 8/2010 | Swietlik et al. |
| 2010/0206584 A1 | 8/2010 | Clubb et al. |
| 2011/0036586 A1 | 2/2011 | Hart et al. |
| 2011/0039086 A1 | 2/2011 | Graham et al. |
| 2011/0088495 A1 | 4/2011 | Buck et al. |

(56) References Cited

U.S. PATENT DOCUMENTS

| | | |
|---|---|---|
| 2011/0214919 A1 | 9/2011 | McClung, III |
| 2011/0280104 A1 | 11/2011 | McClung, III |
| 2012/0020808 A1 | 1/2012 | Lawson et al. |
| 2012/0048574 A1 | 3/2012 | Wiens et al. |
| 2012/0152530 A1 | 6/2012 | Wiedecke et al. |
| 2012/0160517 A1 | 6/2012 | Bouligny et al. |
| 2012/0212326 A1 | 8/2012 | Christiansen et al. |
| 2012/0234107 A1 | 9/2012 | Pindiprolu et al. |
| 2012/0273192 A1 | 11/2012 | Schmidt et al. |
| 2012/0298376 A1 | 11/2012 | Twardowski |
| 2013/0045116 A1 | 2/2013 | Wang et al. |
| 2013/0055858 A1 | 3/2013 | Richardson |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0105178 A1 | 5/2013 | Pietras |
| 2013/0186638 A1 | 7/2013 | Filippov et al. |
| 2013/0207382 A1 | 8/2013 | Robichaux |
| 2013/0207388 A1 | 8/2013 | Jansson et al. |
| 2013/0213669 A1* | 8/2013 | Kriesels ............... E21B 7/20 166/380 |
| 2013/0233624 A1 | 9/2013 | In |
| 2013/0269926 A1 | 10/2013 | Liess et al. |
| 2013/0271576 A1 | 10/2013 | Ellis |
| 2013/0275100 A1* | 10/2013 | Ellis ............... H04N 13/0203 703/2 |
| 2013/0299247 A1 | 11/2013 | Kuttel et al. |
| 2014/0069720 A1 | 3/2014 | Gray |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0262521 A1 | 9/2014 | Bradley et al. |
| 2014/0305662 A1 | 10/2014 | Giroux et al. |
| 2014/0312716 A1 | 10/2014 | Hunter et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2015/0053424 A1 | 2/2015 | Wiens et al. |
| 2015/0083391 A1 | 3/2015 | Bangert et al. |
| 2015/0107385 A1 | 4/2015 | Mullins et al. |
| 2015/0337648 A1 | 11/2015 | Zippel et al. |
| 2016/0024862 A1 | 1/2016 | Wilson et al. |
| 2016/0138348 A1 | 5/2016 | Kunec |
| 2016/0145954 A1 | 5/2016 | Helms et al. |
| 2016/0215592 A1 | 7/2016 | Helms et al. |
| 2016/0230481 A1* | 8/2016 | Misson ............... E21B 19/143 |
| 2016/0342916 A1 | 11/2016 | Arceneaux et al. |
| 2017/0037683 A1 | 2/2017 | Heidecke et al. |
| 2017/0044854 A1 | 2/2017 | Hebebrand et al. |
| 2017/0044875 A1 | 2/2017 | Hebebrand et al. |
| 2017/0051568 A1 | 2/2017 | Wern et al. |
| 2017/0067303 A1 | 3/2017 | Thiemann et al. |
| 2017/0067320 A1 | 3/2017 | Zouhair et al. |
| 2017/0074075 A1 | 3/2017 | Liess |
| 2017/0211327 A1 | 7/2017 | Wern et al. |
| 2017/0211343 A1 | 7/2017 | Thiemann |
| 2017/0284164 A1 | 10/2017 | Holmes et al. |

FOREIGN PATENT DOCUMENTS

| | | |
|---|---|---|
| AU | 2014215938 A1 | 9/2014 |
| AU | 2015234310 A1 | 10/2015 |
| CA | 2 707 050 A1 | 6/2009 |
| CA | 2707050 A1 | 6/2009 |
| CA | 2 841 654 A1 | 8/2015 |
| CA | 2841654 A1 | 8/2015 |
| CA | 2 944 327 A1 | 10/2015 |
| CN | 2412105 Y | 12/2000 |
| CN | 201810278 U | 4/2011 |
| DE | 102007016822 A1 | 10/2008 |
| EP | 0 250 072 A2 | 12/1987 |
| EP | 0 250 072 B1 | 4/1991 |
| EP | 1 619 349 A2 | 1/2006 |
| EP | 1619349 A2 | 1/2006 |
| EP | 1 772 715 A2 | 4/2007 |
| EP | 1772715 A2 | 4/2007 |
| EP | 1 961 912 A1 | 8/2008 |
| EP | 1 961 913 A1 | 8/2008 |
| EP | 1961912 A1 | 8/2008 |
| EP | 1961913 A1 | 8/2008 |
| EP | 2085566 A2 | 8/2009 |
| EP | 2 322 357 A1 | 5/2011 |
| EP | 2808483 A2 | 12/2014 |
| EP | 3032025 A1 | 6/2016 |
| GB | 1487948 A | 10/1977 |
| GB | 2 077 812 A | 12/1981 |
| GB | 2077812 A | 12/1981 |
| GB | 2 180 027 A | 3/1987 |
| GB | 2180027 A | 3/1987 |
| GB | 2 228 025 A | 8/1990 |
| GB | 2228025 A | 8/1990 |
| GB | 2 314 391 A | 12/1997 |
| GB | 2314391 A | 12/1997 |
| WO | 02068788 A2 | 9/2002 |
| WO | 2004/079153 A2 | 9/2004 |
| WO | 2004079153 A2 | 9/2004 |
| WO | 2004/101417 A2 | 11/2004 |
| WO | 2004101417 A2 | 11/2004 |
| WO | 2007/001887 A2 | 1/2007 |
| WO | 2007001887 A2 | 1/2007 |
| WO | 2007/070805 A2 | 6/2007 |
| WO | 2007127737 A2 | 11/2007 |
| WO | 2006005767 A1 | 1/2008 |
| WO | 2009/76648 A2 | 6/2009 |
| WO | 2009/076648 A2 | 6/2009 |
| WO | 2009076648 A2 | 6/2009 |
| WO | 2010057221 A2 | 5/2010 |
| WO | 2012021555 A2 | 2/2012 |
| WO | 2012100019 A1 | 7/2012 |
| WO | 2012/115717 A2 | 8/2012 |
| WO | 2012115717 A2 | 8/2012 |
| WO | 2014056092 A1 | 4/2014 |
| WO | 2014/182272 A1 | 11/2014 |
| WO | 2015/000023 A1 | 1/2015 |
| WO | 2015000023 A1 | 1/2015 |
| WO | 2015/119509 A1 | 8/2015 |
| WO | 2015/127433 A1 | 8/2015 |
| WO | 2015119509 A1 | 8/2015 |
| WO | 2015127433 A1 | 8/2015 |
| WO | 2015176121 A1 | 11/2015 |
| WO | 2016197255 A1 | 12/2016 |
| WO | 2017/044384 A1 | 3/2017 |
| WO | 2017040508 A1 | 3/2017 |

OTHER PUBLICATIONS

Australian Examination Report dated May 15, 2013, Australian Patent Applicatin No. 2012201644.
PCT Search Report for International Application No. PCT/US2008/086699 dated Nov. 9, 2009.
Australian Examination Report for Application No. 2008334992 dated Apr. 5, 2011.
EP Office Action for Application No. 08860261.0-2315 dated Apr. 12, 2011.
EP Search Report for Application No. 12153779.9-2315 dated Apr. 5, 2012.
PCT Search Report for International Application No. PCT/US2008/086699 dated Sep. 9, 2009.
Canadian Office Action dated Aug. 24, 2015, for corresponding Application No. 2,837,581.
EPO Extended European Search Report dated Nov. 23, 2015, for EPO Patent Application No. 15166062.8.
Australian Patent Examination Report dated Feb. 4, 2016, for Australian Patent Application No. 2014215938.
Canadian Office Action dated Apr. 25, 2016, for Canadian Patent Application No. 2,837,581.
PCT International Search Report and Written Opinion dated Jul. 25, 2016, for International Patent Application No. PCT/US2015/061960.

(56) References Cited

OTHER PUBLICATIONS

EPO Extended European Search Report dated Dec. 4, 2017, for European Application No. 17195552.9.
PCT International Search Report and Written Opinion dated Feb. 20, 2017 for International Application No. PCT/US2016/050139.
PCT International Search Report and Written Opinion dated Dec. 14, 2016, for International Patent Application No. PCT/US2016/046458.
"Fundamentals of Hydraulic Motors," Staff Report, Hydraulics and Pneumatics, Jun. 26, 2014, http://hydraulicspneumatics.com/hydraulic-pumps-motors/fundamentals-hydraulic-motors, accessed Aug. 12, 2015 (6 total pages).
A123 Systems, 14Ah Prismatic Pouch Cell, Product Specification, www.a123systems.com.
Eaton Low Speed High Torque Motors E-MOLO-MC001-E6 Brochure, Sep. 2011 (16 total pages).
Warrior, 250E Electric Top Drive (250-TON), 250H Hydraulic Top Drive (250-TON), Brochure, Apr. 2014, Rev. 1, www.warriorrig.com.
Warrior, 500E Electric Top Drive (500 ton—1000hp), Brochure, Document No. EC 009, May 2015, Rev. 3, www.warriorrig.com.
Weatherford, TorkSub™ Stand-Alone Torque Measuring System, Product Specification, Document No. 11368.00, Copyright 2011-2014, www.weatherford.com.
PCT International Search Report and Written Opinion dated Nov. 25, 2016, for International Patent Application No. PCT/US2016/050542.
Streicher Load/Torque Cell System Brochure, Streicher Group, 1 Page.
Enchanced Torque & Tension Sub With Integrated Turns Brochure, 3PS, Inc.,, 2 Pages.
PCT International Search Report and Written Opinion dated Jan. 12, 2017, for International Patent Application No. PCT/US2016/047813.
PCT International Search Report and Written Opinion dated Nov. 22, 2016, for International Patent Application No. PCT/US2016/049462.
PCT International Search Report and Written Opinion dated Apr. 4, 2017, for International Application No. PCT/US2017/014646.
Warrior, 250E Electric Top Drive (250-TON), 250H Hydraulic Top Drive (250-TON), Brochure, Apr. 2014, Rev. 1.
Warrior, 500E Electric Top Drive (500 ton—1000hp), Brochure, Document No. EC 009, May 2015, Rev. 3.
Weatherford, TorkSub™ Stand-Alone Torque Measuring System, Product Specification, Document No. 11368.00, www.weatherford.com.
EPO Extended Europeam Search RPT dated Jun. 8, 2017 for European Pat. Application No. 17152458.0.
EPO Extended European Search Report dated Jun. 8, 2017, for European Patent Application No. 17152458.0.
Australian Examination Report dated Sep. 19, 2017, for Australian Patent Application No. 2017200371.
Australian Examination Report dated Feb. 8, 2018 for Australian Patent Application No. 2017200371.
PCT International Search Report and Written Opinion dated Jun. 8, 2017, for Internaitonal Application No. PCT/US2017/014224.
Lefevre,Bruno et al., "Deeper, more deviated wells push development of smart drill stem rotary shouldered connections," Drilling Technology, (2008), pp. 130-132.
Rotary Sholder Handbook, 2010 National Oilwell Varco, D392002466-MKT-001 Rev.02,116 pages.
Weatherford; Rotaflex Long-Stroke Pumping Units; Artificial Lift Systems; date unknown; 17 total pages.
Analog Devices; Data Sheet; Precision ±1.7 g, ±5 g, ±18 g Single-/Dual-Axis iMEMSO Accelerometer; 2004-2014; 16 total pages.
Dr. Richard Thornton; Elevator World; Linear Synchronous Motors for Elevators; dated Sep. 2006; 2 total pages.
Weatherford; Production Optimization; Stainless Steel Polished-Rod Load Cell dated 2008; 2 total pages.
Wieler, et al.; Elevator World; Linear Synchronous Motor Elevators Become a Reality; dated May 2012; 4 total pages.
MagneMotion; LSM Elevators; White Paper dated 2013; 2 total pages.
Weatherford; Rotaflex Long-Stroke Pumping Units; Proven Technology for Deep, Challenging, and High-Volume Wells; dated 2014; 24 total pages.
U.S. Appl. No. 14/717,441 entitled Dart Detector for Wellbore Tubular Cementation in the name of Zippel, et al; 35 total pages; filed May 20, 2015.
PCT International Search Report and Written Opinion dated Aug. 24, 2016, for International Application No. PCT/US2016/015838.
Bosch Rexroth AG, Electric Drives and Controls, Brochure, "Asynchronous high-speed motors 1MB for high speeds," 6 pages.
Balltec Lifting Solutions, LiftLOK™, Brochure, "Highest integrity lifting tools for the harshest environments," 2 pages.
Balltec Lifting Solutions, CoilLOK™, Brochure, "Highest integrity hand-held coiled tubing handling tools," 2 pages.
A123 System; 14Ah Prismatic Pouch Cell; Nanophosphate® Lithium-Ion; www.a123systems.com; date unknown; 1 page.
Streicher Load/Torque Cell Systems; date unknown; 1 page.
3PS, Inc.; Enhanced Torque and Tension Sub with Integrated Turns; date unknown; 2 total pages.
Lefevre, et al.; Drilling Technology; Deeper, more deviated wells push development of smart drill stem rotary shouldered connections; dated 2008; 2 total pages.
PCT Invitaiton to Pay Additional Fees for International Application No. PCT/US2008/086699; dated Sep. 9, 2009; 7 total pages.
PCT Notification of Transmittal of the International Search Report and the Written Opinion of the International Searching Authority for International Application No. PCT/US2008/086699; dated Sep. 11, 2009; 19 total pages.
National Oilwell Varco; Rotary Shoulder Handbook; dated 2010; 116 total pages.
Weatherford; TorkSub™ Stand-Alone Torque Measuring System; dated 2011-2014; 4 total pages.
Australian Examination Report for Application No. 2008334992; dated Apr. 5, 2011; 2 total pages.
European Search Report for Application No. 08 860 261.0-2315; dated Apr. 12, 2011; 4 total pages.
Eaton; Spool Valve Hydraulic Motors; dated Sep. 2011; 16 total pages.
European Extended Search Report for Application No. 12153779.9-2315; dated Apr. 5, 2012; 4 total pages.
Australian Examination Report for Application No. 2012201644; dated May 15, 2013; 3 total pages.
Warrior; 250E Electric Top Drive (250-TON); 250H Hydraulic Top Drive (250-TON); dated Apr. 2014; 4 total pages.
Hydraulic Pumps & Motors; Fundamentals of Hydraulic Motors; dated Jun. 26, 2014; 6 total pages.
Warrior; Move Pipe Better; 500E Electric Top Drive (500 ton—1000 hp); dated May 2015; 4 total pages.
Canadian Office Action for Application No. 2,837,581; dated Aug. 24, 2015; 3 total pages.
European Extended Search Report for Application No. 15166062.8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 MB for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.

(56) References Cited

OTHER PUBLICATIONS

PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/046458; dated Dec. 14, 2016; 16 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.
Canadian Office Action in related application CA 2,955,754 dated Jul. 17, 2018.
EPO Extended European Search Report dated Jul. 19, 2018, for European Application No. 18159595.0.
EPO Extended European Search Report dated Jul. 17, 2018, for European Application No. 18158050.7.
Cookson, Colter, "Inventions Speed Drilling, Cut Costs," The American Oil & Gas Reporter, Sep. 2015, 2 pages.
Ennaifer, Amine et al., "Step Change in Well Testing Operations," Oilfield Review, Autumn 2014: 26, No. 3, pp. 32-41.
Balltec Lifting Solutions, CoilLOK™ Brochure, "Highest integrity hand-held coiled tubing handling tools," 2 pages.
Peters; Tool Coupler for Use With a Top Drive; U.S. Appl. No. 15/656,508, filed Jul. 21, 2017. (Application not attached to IDS.).
Fuehring et al.; Tool Coupler With Rotating Coupling Method for Top Drive; U.S. Appl. No. 15/445,758, filed Feb. 28, 2017. (Application not attached to IDS.).
Bell; Interchangeable Swivel Combined Multicoupler; U.S. Appl. No. 15/607,159, filed May 26, 2017 (Application not attached to IDS.).
Amezaga; Dual Torque Transfer for Top Drive System; U.S. Appl. No. 15/447,881, filed Mar. 2, 2017. (Application not attached to IDS.).
Zouhair; Coupler With Threaded Connection for Pipe Handler; U.S. Appl. No. 15/444,016, filed Feb. 27, 2017. (Application not attached to IDS.).
Liess; Downhole Tool Coupling System; U.S. Appl. No. 15/670,897, filed Aug. 7, 2017. (Application not attached to IDS.).
Muller et al; Combined Multi-Coupler With Rotating Locking Method for Top Drive; U.S. Appl. No. 15/721,216, filed Sep. 29, 2017. (Application not attached to IDS.).
Amezaga et al; Tool Coupler With Threaded Connection for Top Drive; U.S. Appl. No. 15/457,572, filed Mar. 13, 2017. (Application not attached to IDS.).
Wiens; Combined Multi-Coupler With Locking Clamp Connection for Top Drive; U.S. Appl. No. 15/627,428, filed Jun. 19, 2017. (Application not attached to IDS.).
Henke et al.; Tool Coupler With Sliding Coupling Members for Top Drive; U.S. Appl. No. 15/448,297, filed Mar. 2, 2017. (Application not attached to IDS.).
Schoknecht et al.; Combined Multi-Coupler With Rotating Fixations for Top Drive; U.S. Appl. No. 15/447,926, filed Mar. 2, 2017. (Application not attached to IDS.).
Metzlaff et al.; Combined Multi-Coupler for Top Drive; U.S. Appl. No. 15/627,237, filed Jun. 19, 2017. (Application not attached to IDS.).
Liess; Combined Multi-Coupler for Top Drive; U.S. Appl. No. 15/656,914, filed Jul. 21, 2017. (Application not attached to IDS.).
Liess et al.; Combined Multi-Coupler; U.S. Appl. No. 15/656,684, filed Jul. 21, 2017. (Application not attached to IDS).
Amezaga et al.; Tool Coupler With Data and Signal Transfer Methods for Top Drive; U.S. Appl. No. 15/730,305, filed Oct. 11, 2017. (Application not attached to IDS).
Liess; Tool Coupler With Threaded Connection for Top Drive; U.S. Appl. No. 15/806,560, filed Nov. 8, 2017. (Application not attached to IDS).
EPO Partial European Search Report dated Jul. 31, 2018, for European Application No. 18159597.6.
European Patent Office; Extended Search Report for Application No. 18160808.4; dated Sep. 20, 2018; 8 total pages.
EPO Partial European Search Report dated Oct. 4, 2018, for European Patent Application No. 18159598.4.
EPO Extended European Search Report dated Oct. 5, 2018, for European Patent Application No. 18173275.1.
EPO Extended European Search Report dated Nov. 6, 2018, for European Application No. 18159597.6.
International Search Report and Written Opinion in PCT/US2018/042812 dated Oct. 17, 2018.
Extended Search Report in application EP18177312.8 dated Nov. 6, 2018.
PCT International Search Report and Written Opinion dated Oct. 23, 2018, for International Application No. PCT/US2018/044162.
EPO Extended European Search Report dated Nov. 15, 2018, for European Application No. 18177311.0.
EPO Partial Search Report dated Dec. 4, 2018, for European Patent Application No. 16754089.7.
PCT International Search Report and Written Opinion dated Dec. 19, 2018, for International Application No. PCT/US2016/042813.
PCT International Search Report and Written Opinion dated Jan. 3, 2019, for International Application No. PCT/US2018/0429021.
European Patent Office; Partial Search Report for Application No. 16 754 089.7 dated Dec. 4, 2018; 7 total pages.
EPO Extended European Search Report dated Feb. 18, 2019, for European Application No. 18159598.4.
European Examination Report in related application 16753565.7 dated Aug. 26, 2019.

\* cited by examiner

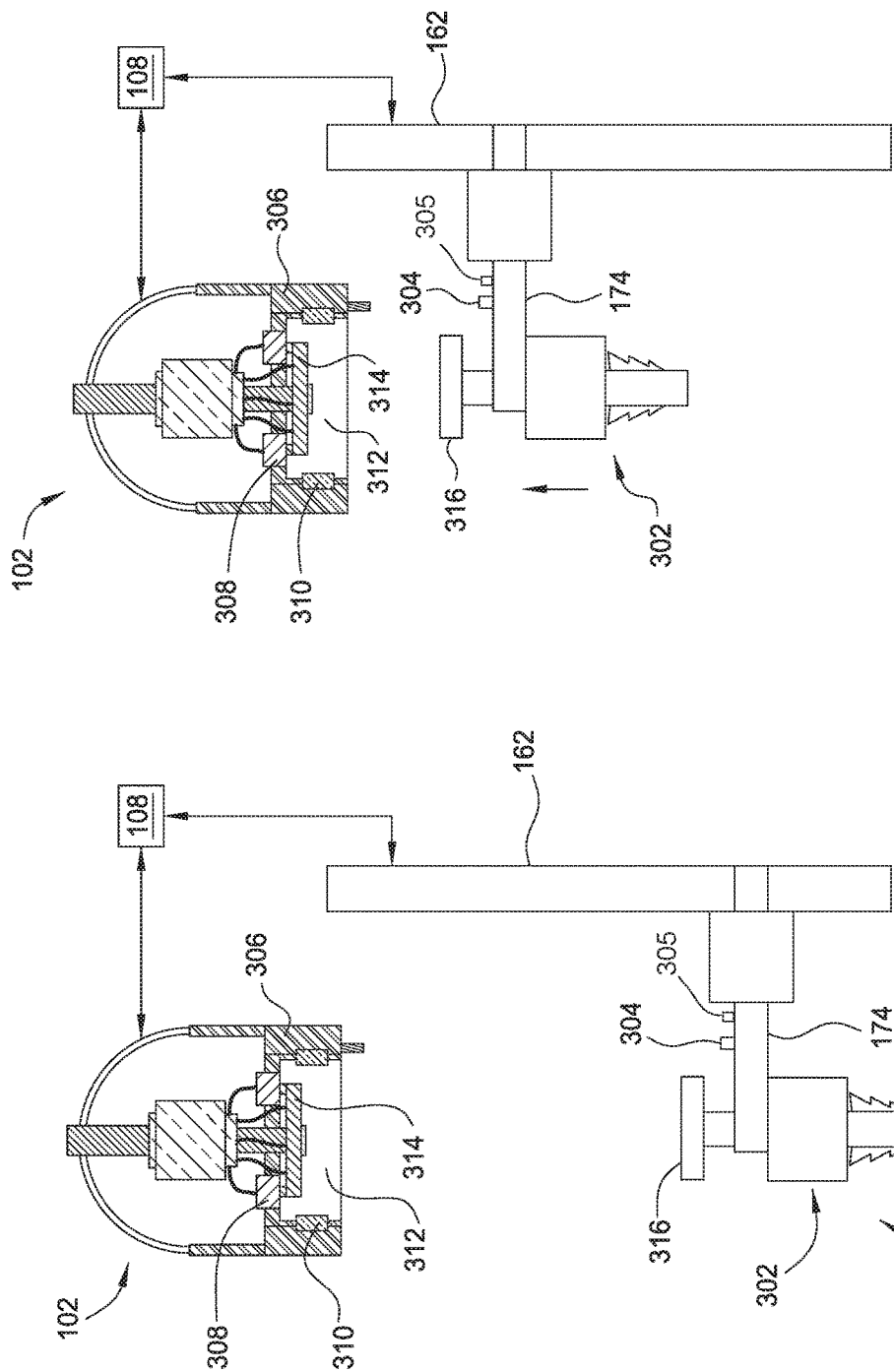

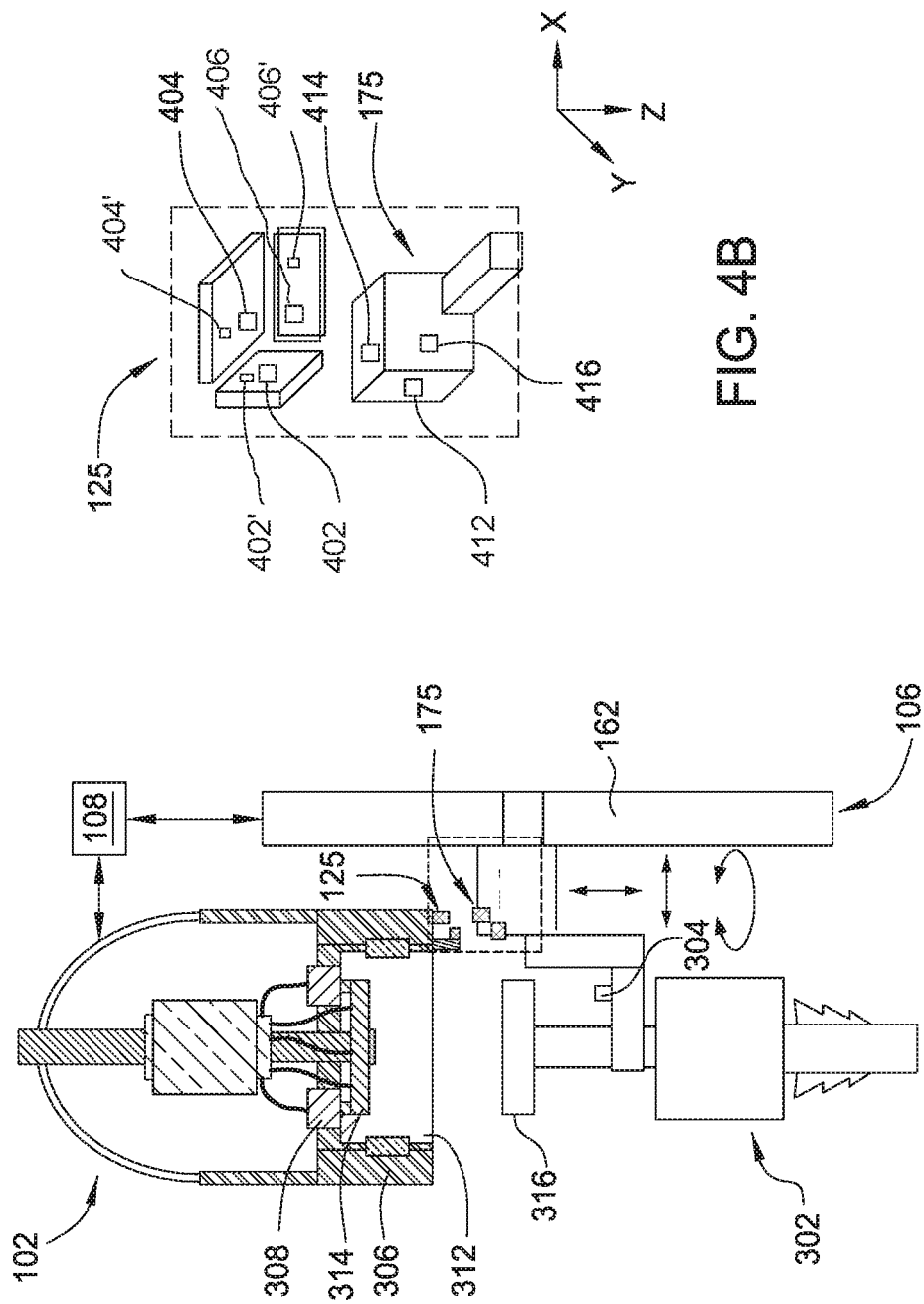

TOOL DETECTION AND ALIGNMENT FOR TOOL INSTALLATION

BACKGROUND OF THE DISCLOSURE

Field of the Disclosure

The present disclosure generally relates to apparatus and methods for detecting and aligning a tool for installation on a rig. More particularly, the present disclosure relates to apparatus and methods for aligning a tool and a top drive to install the tool on the top drive.

Description of the Related Art

During a well operation, various tools are used with a top drive. First, a wellbore is formed to access hydrocarbon-bearing formations (e.g., crude oil and/or natural gas) or for geothermal power generation by drilling. Drilling is accomplished by utilizing a drill bit that is mounted on the end of a drill string. To drill within the wellbore to a predetermined depth, the drill string is connected to a top drive on a surface rig by a drill tool and rotated by the top drive. After drilling to a predetermined depth, the drill tool, drill string and drill bit are removed from the top drive. A casing tool is then attached to the top drive to lower a section of casing into the wellbore. An annulus is thus formed between the string of casing and the formation. The casing string may then be hung from the wellhead. The casing tool may then be replaced by a cement tool to conduct a cementing operation to fill the annulus with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

The tool exchange during drilling, casing, and cementing modes is usually performed manually. For example, a tool is first transported to the top drive by a manually controlled lift, such as a crane or the likes, and then aligned with and installed into the top drive manually. However, manual work at heights on the rig is time consuming and dangerous.

Therefore, there is a need for apparatus and methods for aligning a tool and a top drive to enable automated tool exchange during a well operation.

SUMMARY OF THE DISCLOSURE

The present disclosure generally relates to apparatus and methods of position finding and tool alignment during tool installation.

One embodiment provides a modular top drive system including a top drive unit for selectively connecting to a tool, and an alignment assembly configured to detect a position of the top drive unit relative to the tool.

Another embodiment provides a top drive unit including a drive body, a drive ring movably connected the drive body, and a coupler connected to the drive ring. The coupler is configured to connect with a coupling of a tool. The top drive unit further includes an alignment assembly configured to align the coupling of the tool with the coupler.

Another embodiment provides a tool exchange unit configured to install a tool to a top drive unit. The tool exchange unit includes a tool holder configured to grip the tool, an actuation assembly configured to move the tool holder, and an alignment assembly configured to detect a location of the top drive unit relative to the tool gripped by the tool holder.

Another embodiment provides a method for operating a top drive system. The method includes retrieving a tool, aligning the tool with a top drive unit, and inserting the tool into the top drive unit using an alignment assembly. In one embodiment, retrieving the tool may be performed using a tool exchange unit.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3B schematically illustrate positioning a tool changer relative to a top drive unit according to one embodiment of the present disclosure.

FIGS. 4A-4D schematically illustrate aligning a tool and a top drive unit using proximity sensors according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to apparatus and methods for aligning a tool and a top drive unit to install the tool on the top drive unit. According to embodiments of the present disclosure, aligning a tool with a top drive unit includes adjusting relative positions and/or orientations between the tool and the top drive unit.

Figure 1A:
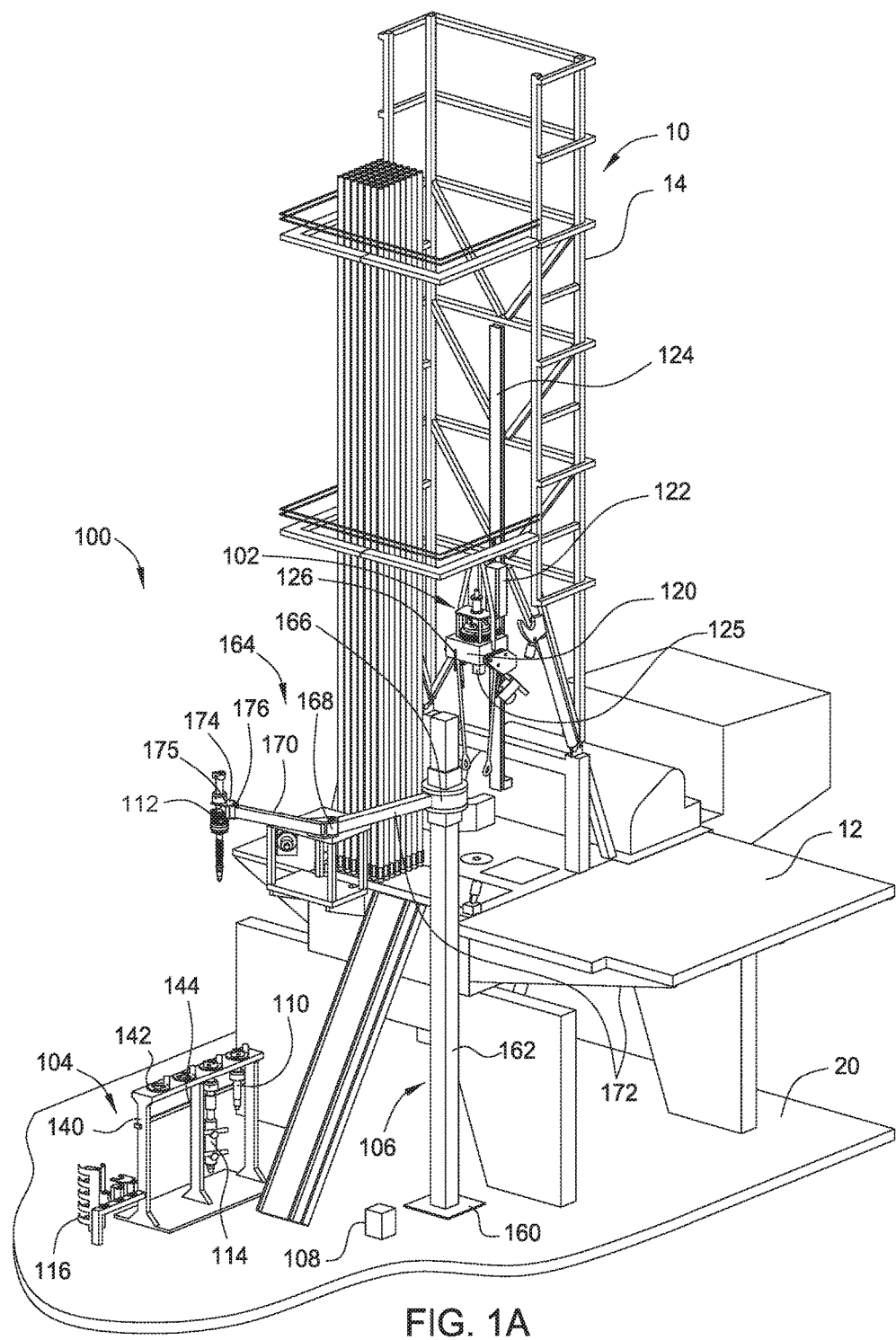
FIG. 1A schematically illustrates a modular top drive system according to one embodiment of the present disclosure.

FIG. 1A schematically illustrates a modular top drive system 100 according to one embodiment of the present disclosure. The modular top drive system 100 may include a top drive unit 102, a tool storage unit 104, and a tool exchange unit 106. In one embodiment, the modular top drive system 100 may further include a central control unit 108 connected to at least one of the top drive unit 102, the tool storage unit 104, and the tool exchange unit 106. The tool exchange unit 106 may automatically position and align tools with the top drive unit 102 before installation of the tools.

The modular top drive system 100 may be used in on a drilling rig 10 to for a well operation. The top drive unit 102 may be mounted on a derrick 14 on a rig floor 12. A plurality of tools may be exchangeably attached to the top drive unit 102 to perform various operations. For example, a drilling tool 110 may be attached to the top drive unit 102 for a drilling operation, a casing tool 112 may be attached to the top drive unit 102 for a casing running operation, a cementing tool 114 may be attached to the top drive unit 102 for a cementing operation, and accessories 116 may be used to perform other operations. The tool storage unit 104 and the tool exchange unit 106 may be disposed on a deck 20. A plurality of tools, such as the drilling tool 110, the casing tool 112, the cementing tool 114, and the accessories 116, may be stored in the tool storage unit 104 when not in use. The tool exchange unit 106 is configured to transfer the plurality of tools between the tool storage unit 104 and the top drive unit 102. The plurality of tools may include a universal coupling so that each of the plurality of tools can be interchangeably connected to the top drive unit 102, stored in the tool storage unit 104, and handled by the tool exchange unit 106.

Figure 1B:
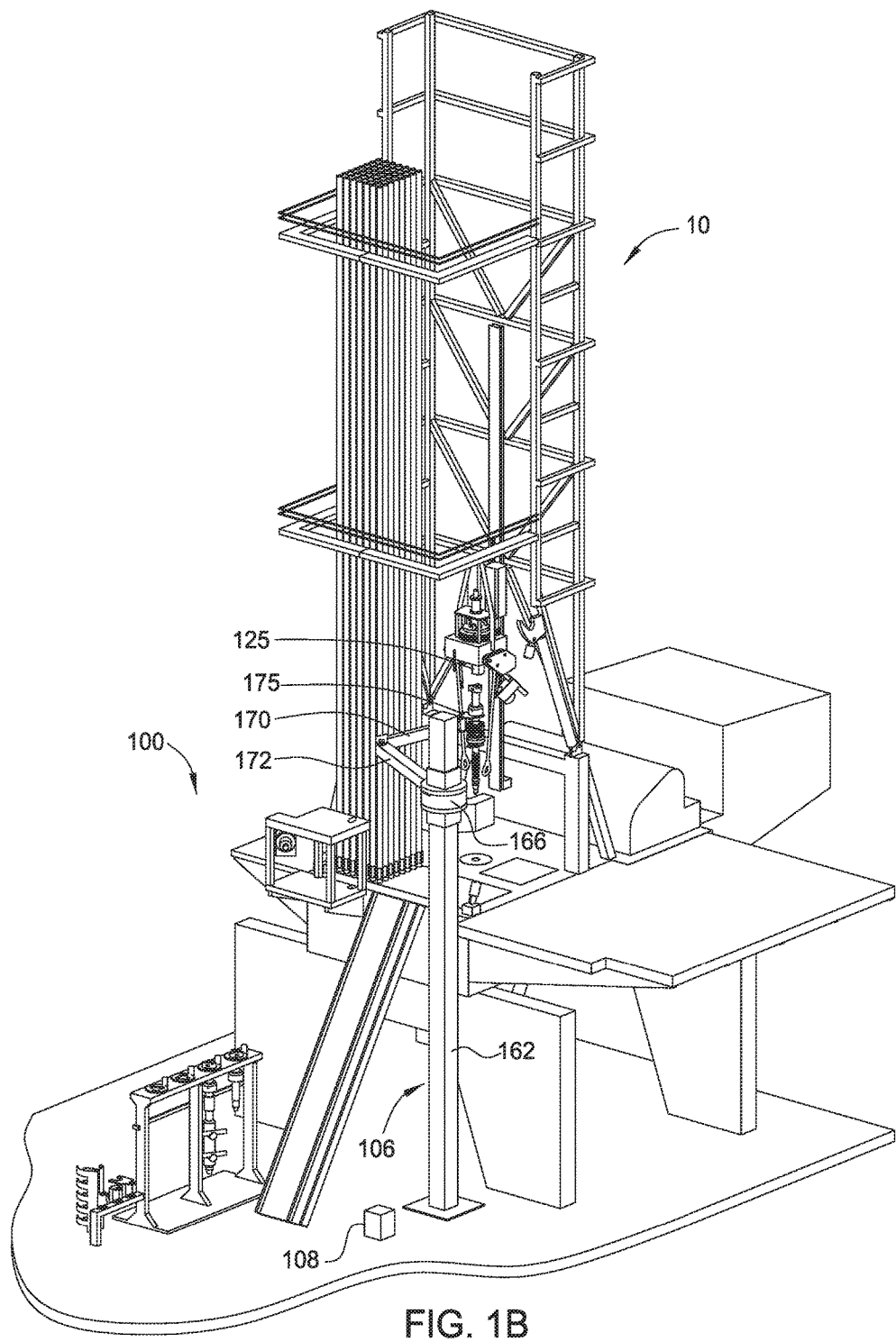
FIG. 1B is a schematic view of the modular top drive system of FIG. 1A at a position of tool alignment.
Figure 1C:
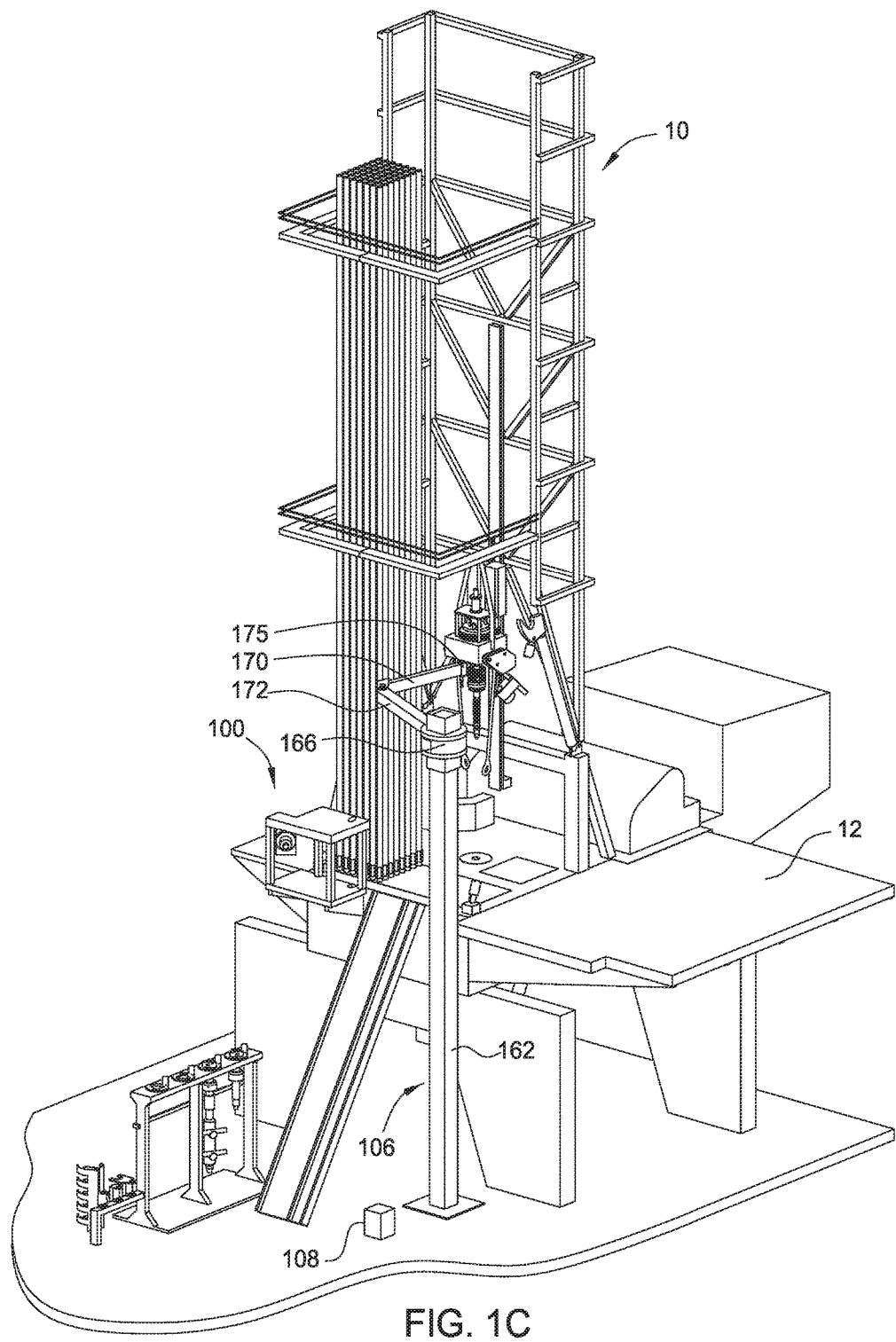
FIG. 1C is a schematic view of the modular top drive system of FIG. 1A at a position of tool installation.

In one embodiment, one or more of the plurality of tools may include an identification device that may be used to identify the tool. In one embodiment, the identification device may also be used to store operational parameters of the tool. Even though the drilling tool 110, the casing tool 112, the cementing tool 114, and the accessories 116 are illustrated in FIGS. 1A-1C, embodiments of the present disclosure may be used to install and align any suitable tools, such as completion tools, fracturing tools, pumps, sand screens, clamping tools, internal gripping tools, external gripping tools, adaptors, or combinations thereof.

In one embodiment, at least one of the tool storage unit 104, the top drive unit 102, and the tool exchange unit 106 includes a reading device configured to interact with the tool identification device and identify the tool. In one embodiment, other tool information, such as gripping outer diameter, calibration factors, and tool dimensions, may be obtained from the tool identification device.

In one embodiment, identification of the tools from the reading device may be transmitted to the central control unit 108 by the top drive unit 102, the tool storage unit 104 or the tool exchange unit 106. The central control unit 108 may use the identification of the tools to control the operation.

The top drive unit 102 may include a coupler 120 configured to selectively connect and operate one or more tools, such as the drilling tool 110, the casing tool 112, the cementing tool 114. The top drive unit 102 may include a trolley 122 configured to couple the coupler 120 to a rail 124 on the derrick 14. In one embodiment, the top drive unit 102 may include a tool identifying device 126. The tool identifying device 126 may be configured to interact with the identification device in each tool connected to the top drive unit 102 or the identification device in each tool to be connected to the top drive unit 102.

The tool storage unit 104 may include a frame 140 and a plurality of tool receiving slots 142. Each of the tool receiving slots 142 may be configured to receive a tool. In one embodiment, the tool storage unit 104 may further include a tool identifying device 144 configured to identify tools disposed in the tool storage unit 104.

The tool exchange unit 106 may include a tool holder 174 configured to grip a tool and an actuation assembly configured to move the tool holder 174. The actuation assembly may include a base 160. The base 160 may be secured to the deck 20 of the drilling rig 10 or adjacent structures. A post 162 may extend from the base 160. The post 162 may extend vertically from the base 160 to a height above the rig floor 12 such that the tool exchange unit 106 may retrieve any of the tools from the tool storage unit 104 and deliver the retrieved tools to the top drive unit 102 and vice versa.

The tool exchange unit 106 further includes a slide hinge 166 connected to the post 162, and an arm 164 connected to the slide hinge 166. The slide hinge 166 may be connected to the post 162 by a linear actuator that moves the slide hinge 166 longitudinally along the post 162. The slide hinge 166 may also be pivotally connected to the linear actuator allowing pivoting of the arm 164 relative to the post 162. The linear actuator may include an electric slew motor, a hydraulic slew motor, or an electro-mechanical linear actuator.

The arm 164 may include an aft-arm 172, a forearm 170, and an actuated joint 168 connecting the forearm 170 and the aft-arm 172. The tool holder 174 may be releasably connected to the forearm 170. The arm 164 may further include an arm actuator (not shown) for selectively curling and extending the forearm 170 and relative to the aft-arm 172. The arm actuator may include a cylinder and a piston disposed in a bore of the cylinder. Alternatively, the arm actuator may include an electro-mechanical linear actuator, such as a motor and lead screw or pinion and gear rod, instead of the piston and cylinder assembly. Alternatively, the actuated joint may be a telescopic joint instead of an elbow.

The tool holder 174 may include a safety latch for retaining any of the tools, such as the drilling tool 110, the casing tool 112, the cementing tool 114, and the accessories 116, thereto after engagement of the holder therewith to prevent unintentional release of the units during handling thereof. Additionally, the tool holder 174 may include a brake for torsionally connecting any of the tools after engagement of the tool holder 174 therewith to facilitate connection to the top drive unit 102.

In one embodiment, the tool holder 174 may grip the tools in a fixed position so that when the tool holder 174 grips a tool, the relative position of the tool to the tool holder 174 is known. In this respect, the positioning and alignment of the tool can be achieved by positioning the tool holder 174 and aligning the tool holder 174. The tool holder 174 may be moved to any target positions by moving the slide hinge 166, the actuated joint 168, and/or other actuated components of the tool exchange unit 106.

In one embodiment, the tool exchange unit 106 may include a tool identifying device 176. The tool identifying device 176 may be disposed near the tool holder 174 to identify the tools engaged by the tool holder 174 or the tools adjacent the tool holder 174. In one embodiment, other tool information, such as gripping outer diameter, calibration factors, and tool dimensions, may be obtained through the tool identifying device 176.

In one embodiment, the tool exchange unit 106 includes a position and alignment assembly 175 configured to facilitate automatic tool installation. In one embodiment, the position and alignment assembly 175 may be configured to position the tool held by the tool exchange unit 106 near the top drive unit 102 and to align the tool with the top drive unit 102 for installation. The position and alignment assembly 175 may include one or more sensors to determine the relative location between the tool exchange unit 106 and the top drive unit 102. In one embodiment, the position and alignment assembly 175 may include separate sensors for positioning and alignment. The position and alignment assembly 175 may include one or more proximity sensors, such as optical sensors, capacitive sensors, and inductive sensors, one or more cameras, such as 2D cameras or 3D cameras.

The position and alignment assembly 175 may be connected to the central control unit 108. The central control unit 108 may receive and process sensor signals from the position and alignment assembly 175 and send control signal to the tool exchange unit 106 to achieve positioning and alignment.

In one embodiment, the top drive unit 102 may include a target assembly 125. The position and alignment assembly 175 on the tool exchange unit 106 may detect or interact with the target assembly 125 to perform tool positioning and alignment. In one embodiment, the target assembly 125 may be one or more passive markers for the position and alignment assembly 175 to visually identify. Alternatively, the target assembly 125 may include one or more passive devices configured to reflect signals back to the position and alignment assembly 175 for positioning and alignment. For example, the target assembly 125 may include one or more proximity sensors. Alternatively, the target assembly 125 may include active devices configured to actively detect the position of the tool exchange unit 106. For example, the position and alignment assembly 175 may include one or more passive markers and the active devices on the target assembly 125 may detect the passive markers and identify the position and alignment assembly 175 when the position and alignment assembly 175 moves within an operation range of the target assembly 125. In another embodiment, the position and alignment assembly 175 may include one or more passive devices configured to reflect signals back to the active devices on the target assembly 125.

Elastic deformation of the tool exchange unit 106 including the tool holder 174 may cause a tilting of the tool gripped thereon, thus leading to misalignment. Additionally, tilting of a rig (such as a sea rig) on which the top drive unit 102 is positioned may also cause misalignment between the tool and the top drive unit 102. According to embodiments of the present disclosure, the alignment assembly 175 may be used to detect and adjust relative orientations between the tool and the top drive unit 102 to prevent misalignment.

To install a particular tool on the top drive unit 102, the tool exchange unit 106 may first approach the tool storage unit 104 to identify and grip the desired tool. The tool exchange unit 106 may move the tool holder 174 in proximity to the tools in the tool storage unit 104. In one embodiment, the tool holder 174 may scan the tools in the tool storage unit 104 so that the tool identifying device 176 can identify the desired tool. Alternatively, the tool identifying device 144 in the tool storage unit 104 may provide tool identity information and tool location information to the central control unit 108. The central control unit 108 may then provide the location of the desired tool to the tool exchange unit 106.

Once the tool exchange unit 106 picks up the desired tool, the tool holder 174 may move the tool towards the top drive unit 102. In FIG. 1A, the tool exchange unit 106 has picked up the tool and is moving it towards the top drive unit 102. The tool exchange unit 106 may move the tool to a location below the top drive unit 102 so that the tool can be aligned with the top drive unit 102. In FIG. 1B, the tool exchange unit 106 is a schematic view of the modular top drive system 100 at a position of tool alignment. In one embodiment, the tool may be gripped by the tool exchange unit 106 in a fixed position so that the tool is aligned with the top drive unit 102 when the tool holder 174 is aligned with the top drive unit 102. Aligning the tool may include adjusting position and/or orientation of the tool relative to the top drive unit 102. After aligning the tool with the top drive unit 102, the tool exchange unit 106 installs the tool to the top drive unit 102. FIG. 1C is a schematic view of the modular top drive system 100 in a position of tool installation.

Even though the alignment assembly 175 is shown attached to the tool exchange unit 106 in FIG. 1A-1C, the alignment assembly 175 may be attached to the top drive unit 102 or the tool being installed. Similarly, the target assembly 125 may be positioned at different locations, such as on the top drive unit 102, on the tool exchange unit 106 or on the tool, to interact with the alignment assembly 175.

Figure 2:
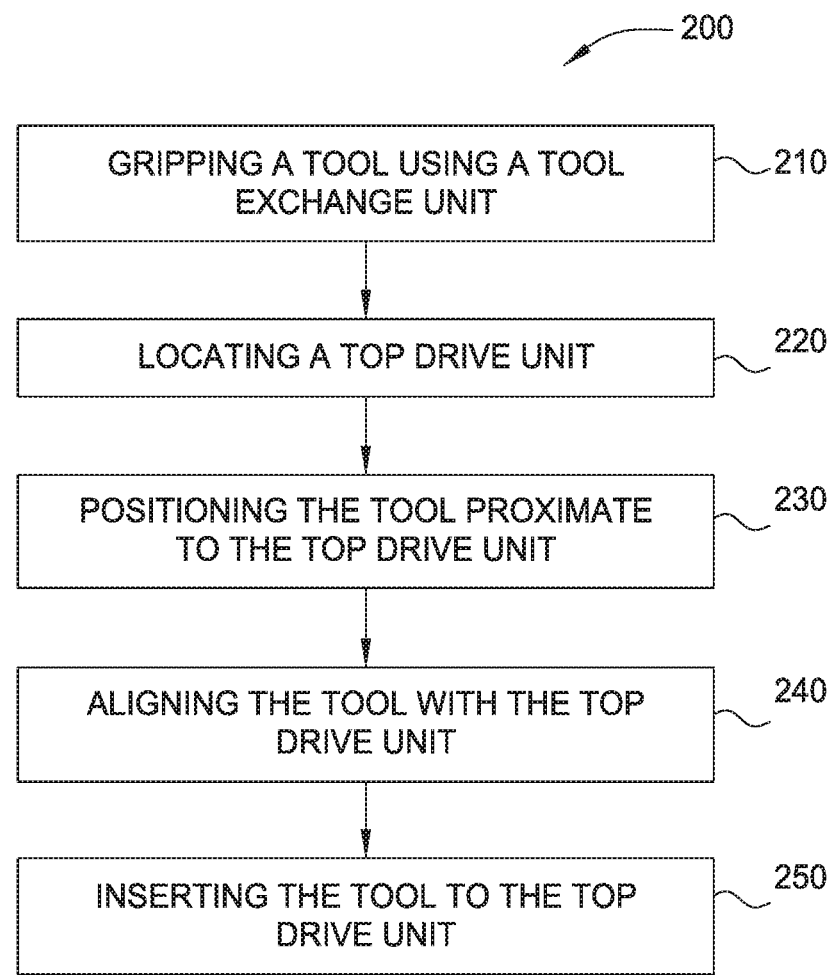
FIG. 2 is a flow chart of a method for tool positioning and installation according to one embodiment of the present disclosure.

In one embodiment, tool alignment may be achieved by a two stage operation. FIG. 2 is a flow chart of a method 200 for tool positioning and installation according to one embodiment of the present disclosure.

In box 210 of the method 200, a tool is gripped by a tool handler, such as the tool exchange unit 106, configured to install the tool to a rig operating system, such as the modular top drive system 100. In one embodiment, the identity of the tool to be installed may be sent to the tool handler and the tool handler identifies the tool using a tool identifying device, such as the tool identifying device 176. In another embodiment, a location of the tool to be installed in a tool storage unit, such as the tool storage unit 104, may be provided to the tool handler so that the tool handler grips the correct tool.

In box 220 of the method 200, a tool receiving unit, such as the top drive unit 102, may be located so that the tool can be aligned with the tool receiving unit. In one embodiment, the tool receiving unit may be located using a sensor disposed on the tool receiving unit and/or on the tool handler. Exemplary sensors include but not limited to lasers, field strength sensors, ultrasound sensors, cameras, and combinations thereof. In one embodiment, the tool handler may move towards the direction of the tool receiving unit until the sensors on the tool handler detect the tool receiving unit. Alternatively, the tool handler may move towards the direction of the tool receiving unit until the sensors on the tool receiving unit detect the tool handler. In one embodiment, the tool handler, such as the tool exchange unit 106, may start at a lower point on the rig floor 12 and moves up towards the tool receiving unit, such as the top drive unit 102, until the sensors on the tool exchange unit 106 detect the top drive unit 102.

If the position of the tool receiving unit, such as the top drive unit 102, is known to a controller, such as the central control unit 108, the step of locating the top drive unit, i.e. box 220, may be omitted. For example, the vertical position of the top drive unit 102 may be known to the central control unit 108 through the position of the trolley 122 relative to the rail 124.

In box 230, when the location of the tool receiving unit is known, the tool handler may move the tool proximate the tool receiving unit to enable alignment. For example, the tool exchange unit 106 may move the tool holder 174 close to the top drive unit 102 so that the position and alignment assembly 175 and the target assembly 125 can interact with each other for alignment. Alternatively, when the tool exchange unit 106 is not down or not present, the tool may be transferred and positioned manually proximate the top drive unit 102. For example, the tool may be moved manually using a joystick.

In box 240, the tool may be aligned with the tool receiving unit for installation. In one embodiment, the tool may be aligned with the tool receiving unit by moving the tool holder and aligning the tool holder with the tool receiving unit. Aligning the tool may include adjusting position and/or orientation of the tool holder relative to the tool receiving unit. In one embodiment, the tool alignment may be performed using corresponding monitoring proximity sensors disposed on the target assembly 125 and on the position and alignment assembly 175. In another embodiment, the tool alignment may be achieved through direct contact between the target assembly 125 and the position and alignment assembly 175. In another embodiment, the tool alignment may be achieved by capturing and analyzing images from a 3D camera. The 3D camera may be disposed on the target assembly 125, on the alignment assembly 175, or any suitable location where the 3D camera has a line of sight of the alignment process. In another embodiment, the tool alignment may be achieved by capturing and analyzing images from 2D cameras. The 2D cameras may be disposed on the position and alignment assembly 175, the target assembly 125, or any suitable locations where the 2D cameras have a line of sight of the alignment process. For example, relative positions of the tool and the receiving unit may be determined by analyzing two dimensional images using triangulation or trilateration.

In box 250, after alignment, the tool may be inserted into a receiving opening in the tool receiving unit, such as the top drive unit 102, by the tool handler, such as the tool exchange unit 106 to complete installation of the tool. In one embodiment, the tool may be connected to the tool receiving unit by a locking connection, such as a bayonet connection. The receiving opening of the tool receiving unit may have an inner profile matching an outer profile of a coupling of the tool. Once the coupling of the tool is inserted through the receiving opening, the tool handler may rotate the tool to connect the tool and tool receiving unit or the drive unit may rotate to connect the tool.

FIGS. 3A-3B schematically illustrate positioning the tool exchange unit 106 relative to the top drive unit 102 according to one embodiment of the present disclosure. The positioning process shown in FIG. 3A-3B may be used to perform the tool locating step in Box 220 of the method 200. In FIG. 3A, a tool 302 is gripped by the tool exchange unit 106. The tool 302 may be a drilling tool, a casing tool, a cementing tool, or any other suitable tools that may be installed on a rig operating system. In one embodiment, the tool 302 may include a coupling 316 shaped to connect with the top drive unit 102. In one embodiment, the relative position of the coupling 316 and the tool holder 174 may be fixed when the tool 302 is gripped by the tool holder 174 so that alignment of the tool 302 with the top drive unit 102 may be achieved by aligning the tool holder 174 and the top drive unit 102.

In one embodiment, a positioning sensor 304 may be attached to the tool holder 174. The positioning sensor 304 may be configured to locate the top drive unit 102. In one embodiment, one or more redundant positioning sensor 305 may be attached to the tool holder 174. The redundant positioning sensor 305 may be used to, for example, in combination with the positioning sensor 304, to detect a tilting angle of the tool 302 on the tool holder 174. The positioning sensor 304 and the redundant positioning sensor 305 may be a laser distance sensor, a field strength sensor, an ultrasound distance sensor, a camera, or combinations thereof.

The top drive unit 102 may include a drive body 306. The drive body 306 may movably attached to a rig. For example, the drive body 306 may be movably attached to the rail 124. The top drive unit 102 may include a drive ring 308. The drive ring 308 may be movably connected to the drive body 306 by thrust bearings 310. The drive ring 308 may define a receiving opening 312 for receiving the tool 302. In one embodiment, a coupler 314 may be disposed in the receiving opening 312. The coupler 316 may be configured to connect with the coupling 316 of the tool 302. In one embodiment, the coupler 316 may be a universal connector having interfaces for transferring torque, hydraulic power, electrical power, and electrical signals.

The top drive unit 102 and the tool exchange unit 106 may be coupled to the central control unit 108. The central control unit 108 may receive sensor signals from and send control signals to the tool exchange unit 106 and the top drive unit 102 to position the tool 302 adjacent the top drive unit 102 for installation.

In FIG. 3A, the tool 302 is at a distance away from the top drive unit 102. The tool exchange unit 106 may move the tool 302 along a general direction, such as vertically upward, towards the top drive unit 102 while monitoring the signals from the positioning sensor 304. The signals from the positioning sensor 304 may be processed by the tool exchange unit 106 or sent to the central control unit 108 for processing. Once the signal from the positioning sensor 304 indicates the top drive unit 102 is within a predetermined range from the tool 302, the tool exchange unit 106 may stop moving and invoke a fine tuning procedure to align the tool 302 with the top drive unit 102. In FIG. 3B, the tool 302 has been moved up and positioned within the range for alignment.

FIGS. 4A-4D schematically illustrate aligning a tool and a top drive unit using proximity sensors according to one embodiment of the present disclosure. The alignment process of FIGS. 4A-4C may be used to perform the alignment step in box 240 of the method 200.

In FIG. 4A, the tool 302 is positioned adjacent the top drive unit 102 so that the target assembly 125 on the top drive unit 102 and the position and alignment assembly 175 on the tool exchange unit 106 can interact with each other. FIG. 4B is a schematic partial enlarged view of one embodiment of the target assembly 125 and one embodiment of the position and alignment assembly 175. In one embodiment, the target assembly 125 may include proximity sensors 402, 404, 406 facing different directions. In one embodiment, the proximity sensors 402, 404, 406 may be positioned facing x, z and y axis of a Cartesian coordination system. In one embodiment, the target assembly 125 may include one or more redundant sensor 402', 404', 406' to facilitate measurement of a relative orientation between the target assembly 125 and the position and alignment assembly 175 a corresponding axis.

In one embodiment, the position and alignment assembly 175 may include reference structures corresponding to the proximity sensors 402, 404, 406 and allowing the proximity sensors 402, 404, 406 to measure corresponding distances. Alternatively, the position and alignment assembly 175 may include proximity sensors 412, 414, 416 facing directions opposite the proximity sensors 402, 404, 406 respectively.

Even though, FIG. 4B illustrates sensor pairs arranged along axis of a Cartesian coordination system, the proximity sensors may be arranged along other coordination systems, such as polar coordinate systems, cylindrical coordinate systems, spherical coordinate systems, curvilinear coordinate systems, or the likes.

The proximity sensors 402, 404, 406, 412, 414, 416 may be optical proximity sensors, capacitive proximity sensors, inductive proximity sensors, or any suitable sensors.

During alignment, the tool exchange unit 106 may move relative to the top drive unit 102 while monitoring the distance between the proximity sensors 402 and 412, the distance between the proximity sensors 404 and 414, and the distance between the proximity sensors 406 and 416. As the combined distance of the sensor pairs reduces, the tool 302 and the top drive unit 102 becomes closer to being aligned. Additionally, relative orientations may be obtained by monitoring differences between the measurement from the proximity sensors 402, 404, 406 and the redundant sensors 402', 404', 406'. The orientations may be adjusted by moving the tool exchange unit relative to the top drive unit 102 to achieve alignment.

Figure 4C:
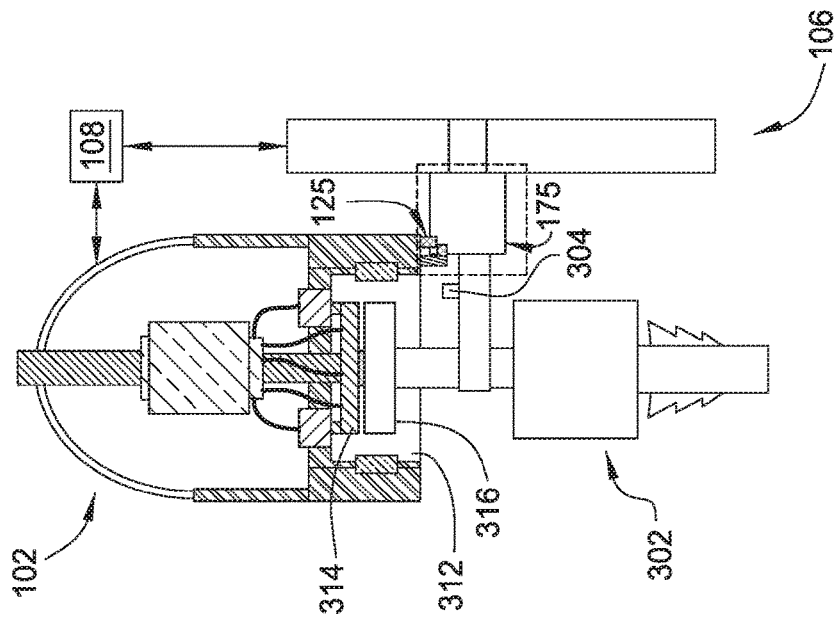

In FIG. 4C, the tool 302 is aligned with the top drive unit 102. At the aligned position, the coupling 316 of the tool 302 may be inserted into the receiving opening 312 of the top drive unit 102.

Figure 4D:
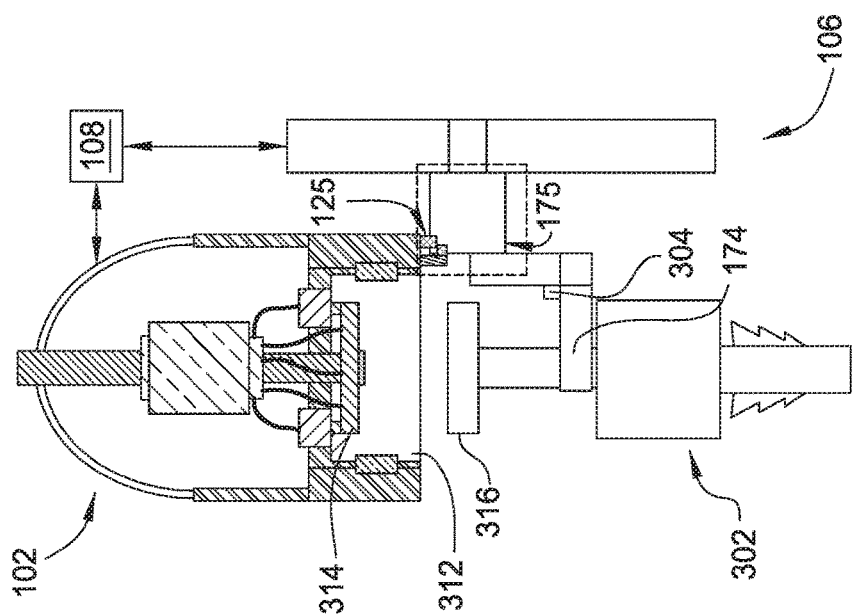

In FIG. 4D, the tool 302 is inserted into the receiving opening 312 of the top drive unit 102. The tool 302 may be inserted by moving the tool holder 174 vertically up. In one embodiment, when at the aligned position, the tool 302 may be moved up at a predetermined distance along the vertical direction to allow the coupling 316 contact the coupler 314 and make a secure connection there between. The tool exchange unit 106 may then release the tool 302 and move away.

Figure 5A:
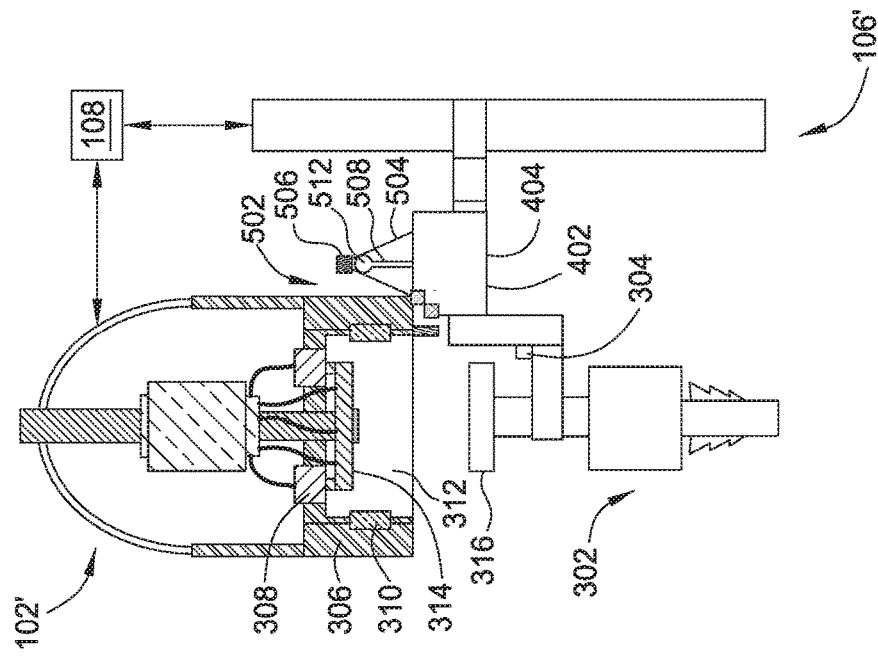
FIGS. 5A-5C schematically illustrate aligning a tool and a top drive unit using a self-alignment structure according to one embodiment of the present disclosure.
Figure 5B:
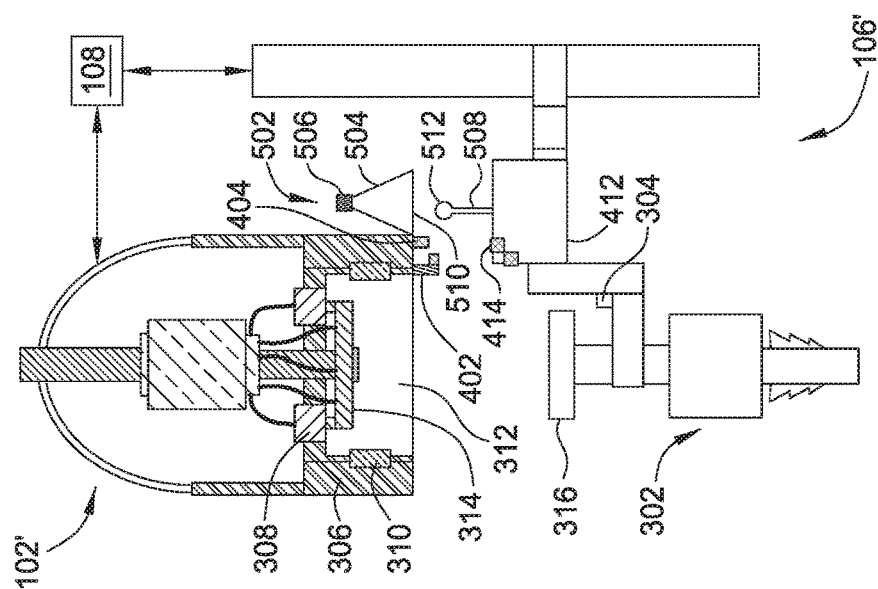
Figure 5C:
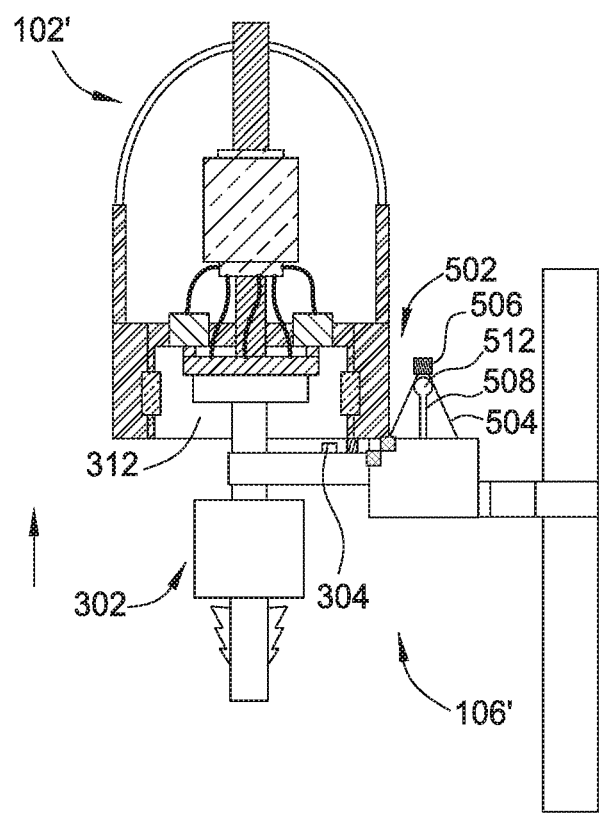

FIGS. 5A-5C schematically illustrate aligning a tool and a top drive unit using a self-alignment structure according to one embodiment of the present disclosure. The alignment process of FIGS. 5A-5B may be used to perform alignment in box 240 of the method 200. In FIGS. 5A-5C, a top drive unit 102' is aligned with the tool 302 by a tool exchange unit 106'.

The top drive unit 102' is similar to the top drive unit 102 of FIG. 4A except that the top drive unit 102' includes a self-alignment assembly 502. In one embodiment, the self-alignment assembly 502 includes a funnel 504 having an opening 510 facing down and an apex 506 at the top of the funnel 504. The opening 510 may be large enough to encompass range of displacement of the tool 302 after a rough positioning process, for example as described in the box 220 of the method 200.

The tool exchange unit 106' is similar to the tool exchange unit 106 of FIG. 4A except that the tool exchange unit 106' includes an alignment structure, such as an alignment pole 508. In one embodiment, the alignment pole 508 may extend from the tool holder 174 so that the relative position of the tool 302 and the alignment pole 508 is fixed. The alignment pole 508 may extend upward towards the top drive unit 102'. When the top drive unit 102' is located by the tool exchange unit 106', such as by process in box 220 of the method 200, the alignment pole 508 may be within the coverage of the opening 510 of the funnel 504. A top 512 of the alignment pole 508 may reach the apex 506 when the tool exchange unit 106' moves up relative to the top drive unit 102'. In one embodiment, the top 512 may include a sensor configured to detect a contact between the top 512 and the funnel 504.

As shown in FIG. 5A, after locating the top drive unit 102', the tool exchange unit 106' may move up with the tool 302 to insert the alignment pole 508 into the funnel 504. As the tool exchange unit 106' moves up, correction movements may be made to avoid contact between the top 512 and the funnel 504. In one embodiment, the sensor on the top 512 may be monitored for any potential contact. The tool exchange unit 106' may move up with corrections until the top 512 contacts or reaches a predetermined proximity with the apex 506 as shown in FIG. 5B.

In FIG. 5B, the tool 302 is aligned with the top drive unit 102'. In FIG. 5C, the tool 302 is moved up along the vertical direction by the tool exchange unit 106' and inserted in to the top drive unit 102'. In one embodiment, when at the aligned position, the tool 302 may be moved up at a predetermined distance along the vertical direction to allow the coupling 316 contact the coupler 314 and make a secure connection there between. The tool exchange unit 106' may then release the tool 302 and move away.

In one embodiment, redundant sensors, such as proximity sensors in three dimensions, and or cameras, may be attached to the top drive unit 102' and/or the tool exchange unit 106 to prevent collision between the alignment pole 508 and the funnel 504.

Figure 6:
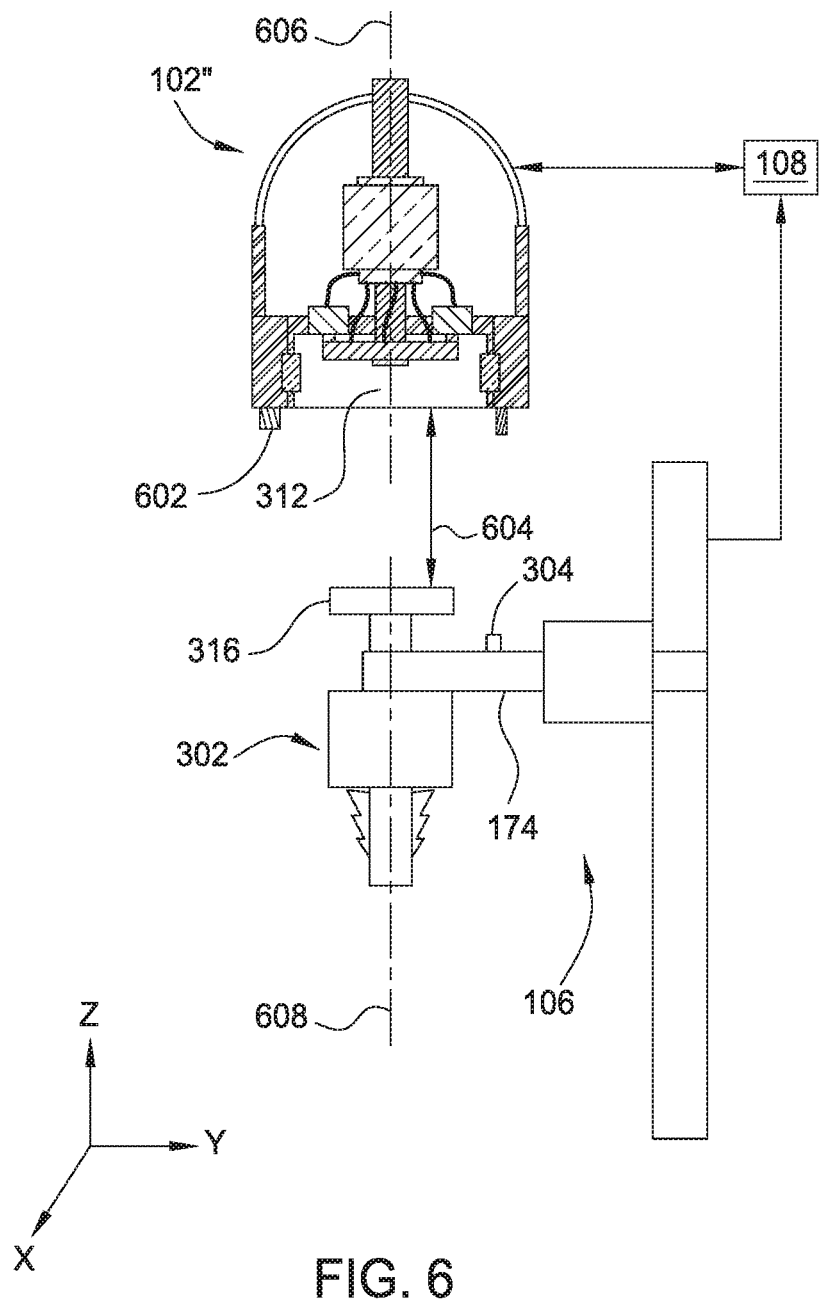
FIG. 6 schematically illustrates aligning a tool and a top drive unit using a 3 dimensional camera.

FIG. 6 schematically illustrates aligning the tool 302 and a top drive unit 102" using a three-dimensional camera. The alignment of FIG. 6 may be used to achieve the alignment of box 240 in the method 200.

The top drive unit 102" is similar to the top drive unit 102 of FIG. 4A except that the top drive unit 102" includes a 3D camera 602 positioned to capture images of the tool 302 positioned below the top drive unit 102". The images of the tool 302 may be sent to the central control unit 108. The central control unit 108 may analyze the 3D images, for example, using a software program, to determine the position and/or orientation of the tool 302. For example, a distance 604 along z direction between the coupling 316 and the top drive unit 102" may be determined from analyzing the 3D images of the coupling 316. Additionally, distances between a central axis 606 of the top drive unit 102" and a central axis 608 of the tool 302 along the x and y directions may be determined. The tool exchange unit 106 may move the tool 302 along x, y, and z direction to reduce the distances and/or adjust the orientation. Once the distances along x, y, z directions are within predetermined values, the tool 302 is aligned with the top drive unit 102".

Alternatively, the 3D camera 602 may be attached to the tool holder 174 and positioned to capture 3 dimensional images of the top drive unit 102". The central control unit 108 may analyze 3D images of the top drive unit 102" to decide the distances for alignment.

The 3D camera 602 may be any suitable camera or camera systems that capable of capturing 3 dimensional images. In one embodiment, the 3D camera 602 is a time-of-flight camera.

Figure 7:
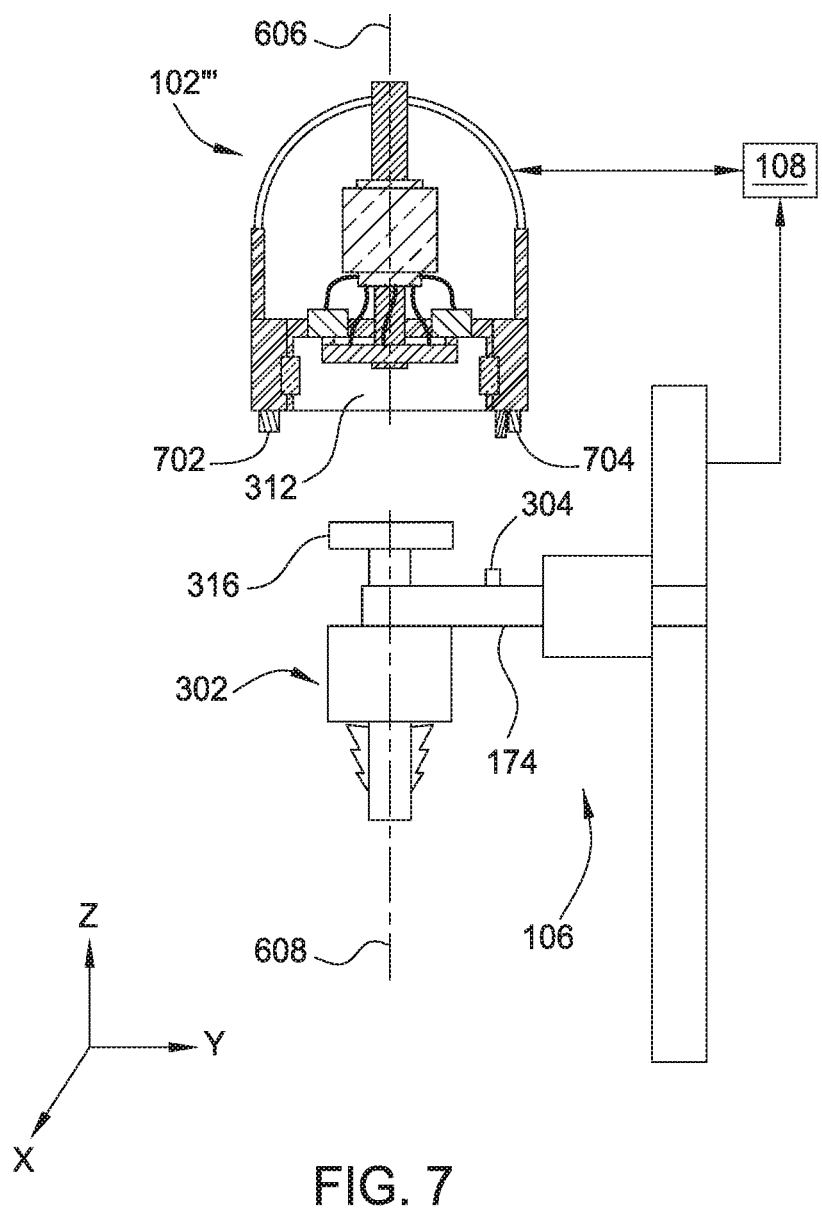
FIG. 7 schematically illustrates aligning a tool and a top drive unit using 2-dimensional cameras.

FIG. 7 schematically illustrates aligning the tool 302 and a top drive unit 102''' using 2-dimensional cameras. The alignment of FIG. 7 may be used to achieve the alignment of box 240 in the method 200.

The top drive unit 102''' is similar to the top drive unit 102 of FIG. 4A except that the top drive unit 102''' includes two or more 2D cameras 702, 704 positioned to capture images of the tool 302 below the top drive unit 102''' from different angles. In one embodiment, the cameras 702, 704 may be disposed at opposite sides of the central axis 606 of the top drive unit 102''' so that the images captured from the cameras 702, 704 are from different angles.

Each of the cameras 702, 704 may take an image of the tool 302 at the same position, and send to the image to the central control unit 108. The central control unit 108 may analyze the images from the cameras 702, 704, for example, using a software program, to determine the position of the tool 302. In one embodiment, triangulation may be used to analyze the images from different cameras 702, 704 to determine the location of the tool 302. Alternatively, trilateration may be used to analyze images from different cameras 702, 704 to determine the location and/or orientation of the tool. In one embodiment, distances between the coupling 316 and the top drive unit 102''' along x, y, z directions may be determined from analyzing the images of the coupling 316 from different cameras 702, 704. The tool exchange unit 106 may move the tool 302 along x, y, and z direction to reduce the distances and/or adjust the orientation. Once the distances along x, y, z directions are within predetermined values, the tool 302 is aligned with the top drive unit 102'''.

Alternatively, two or more cameras may be attached to the tool holder 174 and positioned to capture images of the top drive unit 102''' from different angles. The central control unit 108 may analyze images of the top drive unit 102''' to decide the distances for alignment.

Embodiments of the present disclosure provide a modular top drive system. The modular top drive system includes a top drive unit for selectively connecting to a tool, and an alignment assembly configured to detect a position of the top drive unit relative to the tool.

In one or more embodiments, the modular top drive system further includes a tool exchange unit configured to move the tool relative the top drive unit.

In one or more embodiments, the alignment assembly is disposed on a tool holder of the tool exchange unit.

In one or more embodiments, the alignment assembly comprises first, second, and third proximity sensors attached to the tool exchange unit, and fourth, fifth, and sixth proximity sensors attached to the top drive unit and corresponding to the first, second, third proximity sensors respectively.

In one or more embodiments, the first, second, and third proximity sensors are disposed along x, y, z axis of a Cartesian coordinate system, and the fourth, fifth, and sixth proximity sensors are disposed along x, y, z of the Cartesian coordinate system respectively.

In one or more embodiments, the alignment assembly comprises two or more proximity sensors disposed along a coordinate system, and the top drive unit comprises two or more proximity sensors disposed along the same coordinate system.

In one or more embodiments, the coordinate system is selected from a polar coordinate system, a cylindrical coordinate system, a spherical coordinate system, a curvilinear coordinate system, or the likes.

In one or more embodiments, the alignment assembly comprises a self-alignment structure.

In one or more embodiments, the self-alignment structure includes a funnel attached to the top drive unit, and an alignment pole attached to the tool exchange unit, wherein the alignment pole is configure to insert into the funnel and reach an apex of the funnel.

In one or more embodiments, the modular top drive further includes a sensor disposed on a top of the alignment pole.

In one or more embodiments, the modular top drive further includes one or more proximity sensors disposed on the top drive unit and the tool exchange unit to prevent collision.

In one or more embodiments, the modular top drive further includes one or more proximity sensors disposed on the top drive unit and the tool exchange unit to prevent collision.

In one or more embodiments, the alignment assembly comprises a three dimensional camera.

In one or more embodiments, the alignment assembly comprises two or more two dimensional cameras.

In one or more embodiments, the modular top drive further includes a positioning device configured to position the tool within an operational range of the alignment assembly.

In one or more embodiments, the positioning device comprises one of a laser sensor, a field strength sensor, an ultrasound sensor, a camera, and a combination thereof.

In one or more embodiments, the modular top drive further includes an identification reader configured to obtain identity information from identification devices on tools.

In one or more embodiments, the top drive unit is configured to selectively connect a drilling tool, a casing tool, a cementing tool, a completion tool, a fracturing tool, a pump, a sand screen, a clamping tool, an internal gripping tool, an external gripping tool, an adaptor, or a combination thereof.

Embodiments of the present disclosure provide a top drive unit for construction of a wellbore. The top drive unit includes a drive body, a drive ring movably connected the drive body, a coupler connected to the drive ring, wherein the coupler is configured to connect with a coupling of a tool, and an alignment assembly configured to align the coupling of the tool with the coupler.

In one or more embodiments, the alignment assembly comprises a three dimensional camera attached to the drive body.

In one or more embodiments, the alignment assembly comprises two or more two dimensional cameras attached to the drive body.

In one or more embodiments, the alignment assembly comprises a self-alignment structure attached to the drive body.

In one or more embodiments, the self-alignment structure comprises a funnel.

In one or more embodiments, the alignment assembly comprises three or more proximity sensors.

Embodiments of the present disclosure further provide a tool exchange unit configured to install a tool to a top drive unit. The tool exchange unit includes a tool holder configured to grip the tool, an actuation assembly configured to move the tool holder, and an alignment assembly to detect a location of the top drive unit relative to the tool gripped by the tool holder.

In one or more embodiments, the alignment assembly comprises a three dimensional camera.

In one or more embodiments, the alignment assembly comprises two or more two dimensional cameras.

In one or more embodiments, the alignment assembly comprises a self-alignment structure.

In one or more embodiments, the self-alignment structure comprises an alignment pole configured to insert to a funnel.

In one or more embodiments, the alignment assembly comprises three or more proximity sensors.

Embodiments of the present disclosure further provide a method for operating a top drive system. The method includes retrieving a tool using a tool exchange unit, aligning the tool with a top drive unit using an alignment assembly, and inserting the tool into the top drive unit.

In one or more embodiments, the method further includes positioning the tool proximate the top drive unit.

In one or more embodiments, positioning the tool proximate the top drive unit comprises moving the tool within a range of the alignment assembly.

In one or more embodiments, positioning the tool proximate the top drive unit comprises positioning the tool at a height within a predetermined distance from a height of the top drive unit.

In one or more embodiments, aligning the tool with the top drive unit comprises monitoring distances between proximity sensors mounted on the top drive unit and proximity sensors mounted on the tool exchange unit, and moving the tool exchange unit to reduce the distances.

In one or more embodiments, aligning the tool with the top drive unit comprises moving up the tool exchange unit to insert an aligning pole into a funnel, and monitoring a distance between the aligning pole and the funnel and correcting the upward movement of the tool exchange unit to avoid contact between the alignment pole and the funnel.

In one or more embodiments, aligning the tool with the top drive unit comprises capturing three dimensional images of the top drive unit or the tool, analyzing the three dimensional images to determine distances between the top drive unit and the tool, and moving the tool exchange unit to reduce the distances.

In one or more embodiments, aligning the tool with the top drive unit comprises capturing two dimensional images of the top drive unit or the tool from different angles, analyzing the two dimensional images from different angels to determine distances between the top drive unit and the tool, and moving the tool exchange unit to reduce the distances.

In one or more embodiments, the method further includes, prior to positioning the tool proximate the top drive unit, locating the top drive unit using a positioning device.

Even though the above disclosure describes tool positioning devices and tool alignment assemblies disposed on a top drive unit or a tool exchange unit, embodiments of the present disclosure encompasses tool positioning device and tool alignment assemblies disposed entirely or partially on a tool to be installed.

Even though the above disclosure describes apparatus and method for aligning drilling tools, casing tools, and cementing tools with a top drive, the present disclosure encompasses apparatus and method for aligning any suitable tools, such as completion tools, fracturing tools, pumps, sand screens, clamping tools, internal gripping tools, external gripping tools, adaptors, or combinations thereof.

While the foregoing is directed to embodiments of the present disclosure, other and further embodiments of the disclosure may be devised without departing from the basic scope thereof, and the scope of the invention is determined by the claims that follow.

The invention claimed is:

1. A modular top drive system, comprising:
a top drive unit for selectively connecting to a tool;
a tool exchange unit movable relative to the top drive unit to move the tool relative to the top drive unit; and
an alignment assembly attached to the top drive unit and configured to detect at least one of a relative position and a relative orientation between the top drive unit and the tool;
wherein the top drive unit is movable relative to the tool exchange unit.

2. The modular top drive system of claim 1, wherein the alignment assembly comprises first, second, and third proximity sensors.

3. The modular top drive system of claim 2, further comprising fourth, fifth, and sixth proximity sensors corresponding to the first, second, third proximity sensors respectively, wherein the first, second, and third proximity sensors are disposed along x, y, z axis of a Cartesian coordinate system, and the fourth, fifth, and sixth proximity sensors are disposed along x, y, z of the Cartesian coordinate system respectively.

4. The modular top drive system of claim 1, wherein the alignment assembly comprises two or more proximity sensors disposed along a coordinate system.

5. The modular top drive system of claim 1, wherein the alignment assembly comprises one of a laser sensor, a field strength sensor, an ultrasound sensor, a three dimensional camera, a two dimensional camera, and a combination thereof.

6. The modular top drive system of claim 1, further comprises an identification reader configured to obtain tool information from identification devices on tools.

7. The modular top drive system of claim 1, wherein the alignment assembly interacts with a target assembly coupled to the tool exchange unit to detect the at least one of the relative position and the relative orientation between the top drive unit and the tool.

8. The modular top drive system of claim 1, wherein the alignment assembly is configured to detect the relative position and the relative orientation between the top drive unit and the tool.

9. The modular top drive system of claim 1, wherein the tool exchange unit is configured to retrieve the tool from a storage unit.

10. A modular top drive system, comprising:
a top drive unit for selectively connecting to a tool; and
an alignment assembly having a self-alignment structure and configured to detect at least one of a relative position and a relative orientation between the top drive unit and the tool, the self-alignment structure comprising:
a funnel attached to the top drive unit; and
an alignment pole attached to a tool exchange unit, wherein the alignment pole is configured to insert into the funnel and reach an apex of the funnel.

11. The modular top drive system of claim 10, further comprising a sensor disposed on a top of the alignment pole.

12. The modular top drive system of claim 11, further comprising one or more proximity sensors disposed on the top drive unit or the tool exchange unit to prevent collision.

13. The modular top drive system of claim 10, wherein the alignment assembly is configured to detect the relative position and the relative orientation between the top drive unit and the tool.

14. A tool exchange unit configured to install a tool to a top drive unit, comprising:
a tool holder configured to grip the tool;
an actuation assembly configured to move the tool holder and the tool relative to the top drive unit from a first position suspended below the top drive unit to a second position, wherein the tool is inserted in the top drive unit in the second position; and
an alignment assembly coupled to the tool holder and configured to detect at least one of a location and an orientation of the top drive unit relative to the tool gripped by the tool holder;
wherein the top drive unit is movable relative to the tool holder, actuation assembly, and the alignment assembly.

15. The tool exchange unit of claim 14, wherein the alignment assembly comprises one or more cameras, a self-alignment structure, a laser sensor, a field strength sensor, an ultrasound sensor, or one or more proximity sensors.

16. The tool exchange unit of claim 14, wherein the alignment assembly interacts with a target assembly attached to the top drive unit to detect the at least one of the location and the orientation of the top drive unit relative to the tool gripped by the tool holder.

17. The tool exchange unit of claim 14, wherein the tool exchange unit is movable horizontally relative to the top drive unit.

18. The tool exchange unit of claim 14, wherein the alignment assembly is configured to detect the relative location and the relative orientation of the top drive unit relative to the tool gripped by the tool holder.

19. A method for operating a top drive system, comprising:
retrieving a tool using a tool exchange unit;
moving the tool relative to a top drive unit to a first position below the top drive unit by moving the tool exchange unit relative to the top drive unit;
aligning the tool with the top drive unit using an alignment assembly configured to detect at least one of a relative position and a relative orientation between the top drive unit and the tool; and
inserting the tool into the top drive unit.

20. The method of claim 19, further comprising positioning the tool proximate the top drive unit.

21. The method of claim 19, wherein aligning the tool with the top drive unit comprises:
monitoring distances between a target assembly mounted on the top drive unit and the alignment assembly mounted on the tool exchange unit; and
moving the tool exchange unit to adjust a distance or an orientation between the top drive unit and the tool.

22. The method of claim 19, wherein the alignment assembly is a funnel attached to the top drive unit, and wherein aligning the tool with the top drive unit comprises:
moving the tool exchange unit upward to insert an aligning pole attached to the tool exchange unit into the funnel; and
monitoring a distance between the aligning pole and the funnel and correcting the upward movement of the tool exchange unit to avoid contact between the alignment pole and the funnel.

23. The method of claim 19, wherein the alignment assembly further comprises at least one camera, and wherein aligning the tool with the top drive unit comprises:
capturing a three dimensional image of the top drive unit or the tool;
analyzing the three dimensional image to determine a distance or an orientation between the top drive unit and the tool; and
moving the tool exchange unit to adjust the distance or the orientation.

24. The method of claim 19, wherein the alignment assembly interacts with a target assembly to detect the at least one of the relative position and the relative orientation between the top drive unit and the tool.

25. The method of claim 19, wherein the alignment assembly is configured to detect the relative position and the relative orientation between the top drive unit and the tool.

26. The method of claim 19, wherein the tool is retrieved from a storage unit.

* * * * *